United States Patent
Stone et al.

(10) Patent No.: US 8,291,096 B2
(45) Date of Patent: Oct. 16, 2012

(54) CENTRAL ADMINSTRATION OF ONE OR MORE RESOURCES

(75) Inventors: Andrew J. Stone, Chicago, IL (US); Marty Jablonski, Chicago, IL (US); Tim Huckaby, Carlsbad, CA (US); Brad Sherrell, Newport Beach, CA (US); Bruce Russell, Carlsbad, CA (US); Tim McCarthy, Carlsbad, CA (US); Robin Sannar, Carlsbad, CA (US)

(73) Assignee: Accenture Global Services Limited, Dublin (IE)

( * ) Notice: Subject to any disclaimer, the term of this patent is extended or adjusted under 35 U.S.C. 154(b) by 301 days.

(21) Appl. No.: 11/518,836

(22) Filed: Sep. 11, 2006

(65) Prior Publication Data
US 2007/0094392 A1    Apr. 26, 2007

Related U.S. Application Data

(62) Division of application No. 10/288,275, filed on Nov. 5, 2002.

(60) Provisional application No. 60/332,874, filed on Nov. 5, 2001.

(51) Int. Cl.
*G06F 7/04* (2006.01)
*G06F 15/16* (2006.01)
*G06F 17/30* (2006.01)
*G06F 15/173* (2006.01)
*H04L 29/06* (2006.01)

(52) U.S. Cl. ........ 709/229; 709/203; 709/208; 709/217; 709/223; 709/227; 726/3; 726/5; 726/8

(58) Field of Classification Search .................. 709/229; 726/5, 8
See application file for complete search history.

(56) References Cited

U.S. PATENT DOCUMENTS

| | | | |
|---|---|---|---|
| 5,995,948 A * | 11/1999 | Whitford et al. | 705/41 |
| 6,088,451 A * | 7/2000 | He et al. | 709/227 |
| 6,115,715 A | 9/2000 | Traversat et al. | |
| 6,144,959 A * | 11/2000 | Anderson et al. | 709/203 |
| 6,178,511 B1 * | 1/2001 | Cohen et al. | 726/6 |
| 6,421,719 B1 | 7/2002 | Lewis et al. | |
| 6,463,470 B1 | 10/2002 | Mohaban et al. | |
| 6,754,702 B1 * | 6/2004 | Kennelly et al. | 709/223 |
| 6,850,928 B1 | 2/2005 | McClure et al. | |
| 6,950,880 B1 | 9/2005 | Durrant et al. | |

(Continued)

OTHER PUBLICATIONS

U.S. Appl. No. 10/288,275, filed Nov. 5, 2002, Andrew J. Stone et al.

(Continued)

*Primary Examiner* — Ian N Moore
*Assistant Examiner* — Jenee Alexander
(74) *Attorney, Agent, or Firm* — Mannava & Kang, P.C.

(57) ABSTRACT

A central administration tool or manager supports entry or selection of attribute data or datum (e.g., an attribute value) associated with at least one of a resource and a user. The entered or selected attribute data is arranged into a data structure (e.g., a file) for transmission over a communications network. The data structure is transmitted over the communications network to a directory interface. The transmitted data structure is processed to be compatible with interpretation by a directory services system. The directory services system is invoked consistent with the contents of the data structure (e.g., the file) and the previous processing of the data structure. Resources (e.g., applications) that are under the control of the directory services are managed consistent with the contents of the data structure.

11 Claims, 20 Drawing Sheets

U.S. PATENT DOCUMENTS

| | | |
|---|---|---|
| 7,047,563 B1 | 5/2006 | Weber et al. |
| 7,069,309 B1 | 6/2006 | Dodrill et al. |
| 7,155,616 B1 * | 12/2006 | Hamlin .......... 709/229 |
| 7,231,517 B1 * | 6/2007 | Mashayekhi .......... 726/8 |
| 7,240,125 B2 | 7/2007 | Fleming |
| 7,269,625 B1 | 9/2007 | Willhide et al. |
| 7,350,229 B1 * | 3/2008 | Lander .......... 709/229 |
| 7,457,858 B1 | 11/2008 | Levesque et al. |
| 2001/0027445 A1 | 10/2001 | Eichelsdoerfer |
| 2001/0034733 A1 | 10/2001 | Prompt et al. |
| 2002/0049693 A1 | 4/2002 | Gase |
| 2002/0059466 A1 * | 5/2002 | Poindexter et al. .......... 709/249 |
| 2002/0083343 A1 | 6/2002 | Crosbie et al. |
| 2002/0091798 A1 | 7/2002 | Joshi et al. |
| 2002/0138488 A1 | 9/2002 | Trivedi |
| 2003/0074580 A1 * | 4/2003 | Knouse et al. .......... 709/223 |
| 2003/0088786 A1 | 5/2003 | Moran et al. |
| 2003/0163555 A1 | 8/2003 | Battou et al. |
| 2003/0233439 A1 | 12/2003 | Stone et al. |
| 2004/0158746 A1 * | 8/2004 | Hu et al. .......... 713/202 |
| 2004/0205731 A1 | 10/2004 | Junkermann |
| 2005/0216582 A1 * | 9/2005 | Toomey et al. .......... 709/224 |
| 2007/0094392 A1 | 4/2007 | Stone et al. |
| 2008/0127320 A1 * | 5/2008 | De Lutiis et al. .......... 726/9 |

OTHER PUBLICATIONS

Stevens "TCP/IP Illustrated, vol. 1: The Protocols", 1994, Addison-Wesley, pp. 9-10.

* cited by examiner

Web Management Console

○ Pacific Life
◇□ SAC
  ◇□ Users
    ◇□ User Add
    ◇□ User Edit
    ◇□ User Add Templates
      □ andy stone
      □ Test
      □ Supervisor01
      □ workflow
      □ Test12
  ◇□ Groups
  ◇□ Logs
  ◇□ Configuration
  ◇□ Web Console Management

Single Administration Console — user.

Add New Users   Container: [OU-Users-Groups]

General

| Field | Value |
|---|---|
| First Name | Andy |
| Initials | |
| Last Name | Stone |
| Display Name | Stone, Andy |
| Common Name | Andy Stone |
| Description | Test |
| Office | Newport Beach |
| Telephone | 7869 |
| Email | andy.stone@pacificlife.com |
| Web page | http://www.pacificlife.com |

[Save As Template]         [<Previous] [Next>] [Cancel]

*FIG. 8*

Web Management Console

- Pacific Life
  - SAC
    - Users
    - Groups
      - Group Add
      - Group Edit
      - Group Add Templates
    - Logs
    - Configuration
    - Web Console Management

Single Administration Console

Add New Group   Containers: [OU-Users-Groups]

Ready To Add
Create On - Test Group OU-Users-Groups

- Group Name - Test Group
- Description - Test
- Email -
- LifeApp - Workflow
- Members -
- Member Of -
- Auditing Audit Percent -
- Auditing Field Name -
- Auditing Operator -
- Auditing Value -
- Document Indexing - False
- Editing Read Only Fields - False

[Save As Template]          [<Previous] [Next>] [Cancel]

*FIG. 14*

# CENTRAL ADMINSTRATION OF ONE OR MORE RESOURCES

This application is a divisional patent application of application Ser. No. 10/288,275, filed Nov. 5, 2002, (now pending), the entire contents of which are incorporated herein by reference, wherein Applicants claim, under 35 U.S.C. §119 (e), the benefit of priority of the filing date of Nov. 5, 2001 of U.S. Provisional Patent Application Ser. No. 60/332,874, filed on the aforementioned date.

FIELD OF THE INVENTION

This invention relates to a security administration method and system for remotely managing and administering one or more resources via a communications network.

BACKGROUND

In the prior art, a server may have an administrative module for management of the administration of one or more resources associated with the server. The administration module typically supports local access of an administrator for management or administration of one or more of the following: users, groups, and resources. Local access may mean that an administrator or a technician may perform maintenance or operations support by electrically or electromagnetically coupling a terminal to a port of the server.

To revise settings associated with users an administrator may need to travel to a server located at a remote location. Travel expenses and the attendant delay associated with traveling may increase the time required for the implementation of an additional resource, troubleshooting of an existing resource, modification of settings to comply with user preferences, or other modifications. Thus, a need exists for administration and management of resources remotely via a communications network such as the Internet.

SUMMARY OF THE INVENTION

In accordance with the invention, a central administration tool or manager supports entry or selection of attribute data or datum (e.g., an attribute value) associated with at least one of a resource and a user. The entered or selected attribute data is arranged into a data structure (e.g., a file) for transmission over a communications network. The data structure is transmitted over the communications network to a directory interface. The transmitted data structure is processed to be compatible with interpretation by a directory services system. The directory services system is invoked consistent with the contents of the data structure (e.g., the file) and the previous processing of the data structure. Resources (e.g., applications) that are under the control of the directory services are managed consistent with the contents of the data structure.

Accordingly, an administrator may administer resources remotely from a central administrative tool, which may be located at a central site apart from the directory services system. The elimination of travel expenses and delays from the central administration tool reduce the cost of administering resources. Further, the central administrative tool may support batch or aggregate transactions that relate to multiple users, multiple attributes, multiple groups and multiple resources to promote a convenient process for administering resources to one or more data processing systems (e.g., servers).

BRIEF DESCRIPTION OF THE DRAWINGS

FIG. 7 through FIG. 16, inclusive, represent illustrative views of a display of the user interface of any of the embodiments disclosed herein.

DETAILED DESCRIPTION

Figure 1:
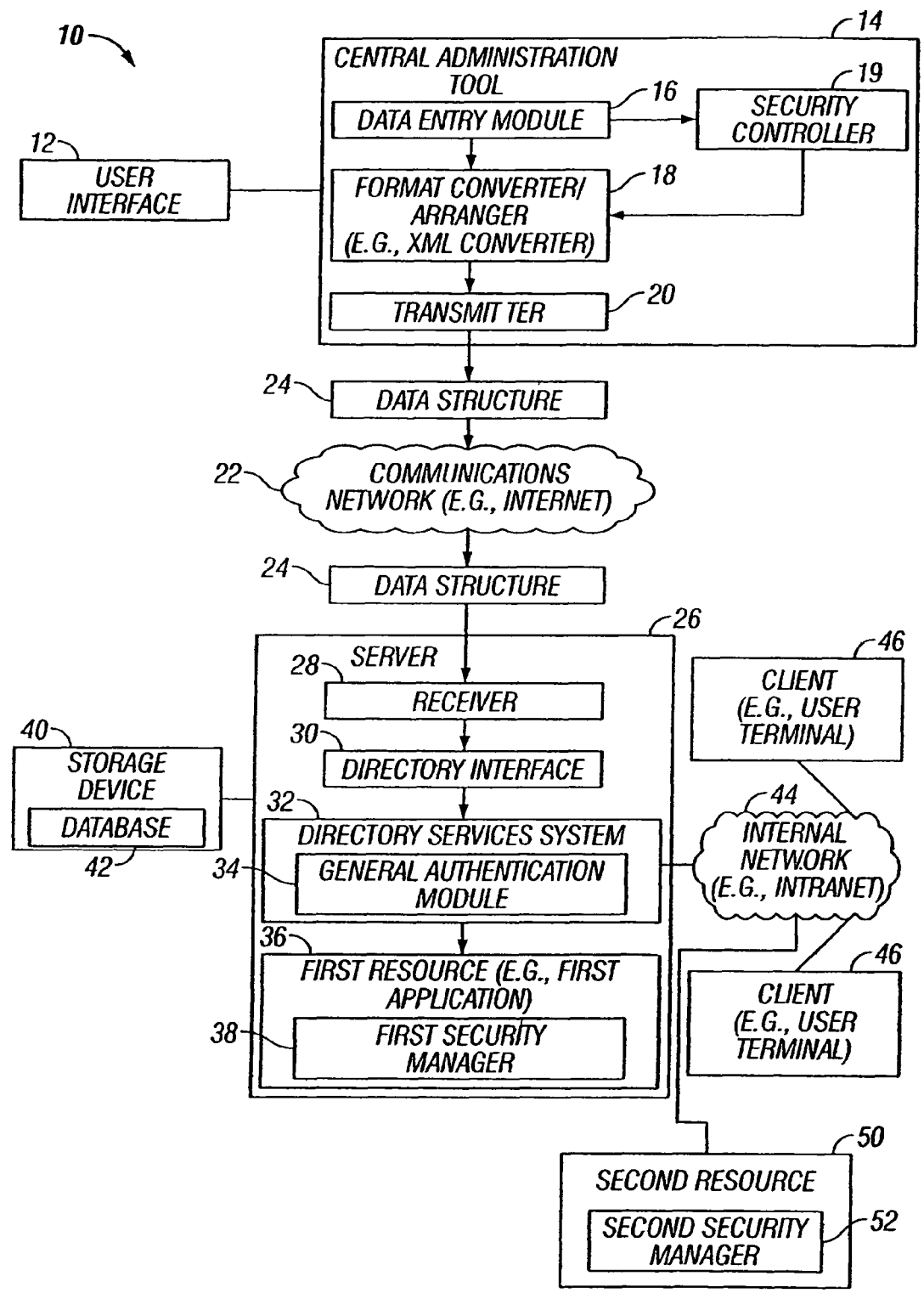
FIG. 1 is a block diagram of a system for administering one or more resources in a client-server data processing environment or a network in accordance with the invention.

In accordance with the invention, FIG. 1 shows a block diagram of a client-server data processing system 10 or a network. The client-server data processing system 10 includes a central administration tool 14 for administering maintenance and operation for one or more clients 46 that seek access to one or more resources (e.g., 36 and 50) via an internal network 44 or another communications network. A central administration tool 14 communicates with a server 26 via a communications network 22 (e.g., the Internet). A user interface 12 is coupled to the central administration tool 14 to support an administrator's entry or selection of information such as attributes of users, attributes of groups, attributes of resources, attributes of objects, access of users or groups to resources, configurations, or other data associated with operations and maintenance of the client-server data processing system 10.

The server 26 may be coupled to one or more clients 46 via an internal network 44 (e.g., intranet). The server 26 may be coupled to a storage device 40 that stores a database 42. Clients 46 (e.g., user terminals) may seek access to a first resource 36 (e.g., a first application) associated with the server 26 or a second resource 50 via the internal network 44.

The central administration tool 14 comprises a data entry module 16 coupled to a format converter-arranger 18. Further, the central administration tool 14 includes a transmitter 20 in communication with the format converter-arranger 18. A security controller 19 may manage an administrator's remote access to the first resource 36, the second resource 50, or both to facilitate the management of attribute data. The security controller 19 may support an administrator's entry of a global password and an account identifier (e.g., log-in identifier) via the user interface 12 to gain access to one or more resources (36, 50) in a single transaction from the administrator's perspective.

An administrator or user may select or enter attribute values of attributes via the user interface 12 as supported by the data entry module 16. In one embodiment, the user interface 12 comprises a graphical user interface and the data entry module 16 cooperates with and supports the graphical user interface. The data entry module 16 facilitates an administrator's entry of data on attributes, attribute values or other parameters associated with resources, objects, users or groups. In one embodiment, the data entry module 16 may facilitate the selection of data attributes and data attribute values on an electronic form or template. In another embodiment, the data entry module 16 supports menu-driven data input into the user interface 12.

The format converter-arranger 18 accepts the entered data from the data entry module 16 and converts or arranges the entered data into a file format or another data structure that is suitable for communication over the communications network 22. For example, format converter-arranger 18 may comprise an extensible markup language (XML) converter. The format converter-arranger 18 may be coupled to the transmitter 20. Extensible markup language is a specification for an electronic document or a file that is compatible for transmission over the Internet or another communications network. XML defines the data structure that supports customization of tags to support the definition, transmission, validation, and interpretation of data between different entities or users.

The transmitter 20 may support the transmission of data packets or another data structure over the communications network. In one embodiment, the transmitter 20 may support the transmission of the formatted file or another data structure consistent with HTTP, HTTPS or another suitable format. HTTP refers to hypertext transfer protocol and HTTPS refers to hypertext transfer protocol in a secure (e.g., encrypted) mode. HTTP is a protocol that defines the format of the messages, the transmission of the messages and the response of network devices (e.g., web browsers). HTTPS supports the secure transfer of one or more messages over a communications network.

In an alternate embodiment, the communications between the central administration tool 14 and the server 26 may take place via a virtual private network, a dedicated link, a public-switched telephone network (PSTN), or by another suitable communications technique.

The server 26 comprises a receiver 28, which is arranged to receive a transmission of a data structure 24 (e.g., an XML file), data packets, or another suitable data structure from the transmitter 20. The receiver 28 is coupled to a directory interface 30. In turn, the directory interface 30 is coupled to a directory services system 32. The server 26 or an associated computer may host or support a first resource 36 (e.g., a first application). A second resource 44 may be coupled to the internal network 44 and may be associated with an additional server, computer, or network element.

The receiver 28 receives the transmitted data structure 24 (e.g., an XML file) from the central administration tool 14 via the communications network 22. The receiver 28 may comprise a data packet receiver 28, for example. The receiver 28 may contain a buffer for buffering the file or data structure upon receipt. The receiver 28 is coupled to a directory interface 30. The directory interface 30 may parse or otherwise process data in the data structure 24 (e.g., an XML file) for arrangement in a format that is compatible with the directory services system 32.

As shown in FIG. 1, the directory services system 32 includes a central authentication module 34 for authorization and authentication of one or more clients 46 who seek access to at least one resource (e.g., 36 or 50). The central authentication module 34 supports requests for an access grant of the clients 46 via the internal network 44. In one embodiment, the central authentication module 34 may grant access of one or more clients 46 to one or more resources (e.g., the first resource 36 or the second resource 50), consistent with the entry of a password and a proper log-in identifier. The central authentication module 34 first authenticates whether a password and log-in identifier (e.g., account identifier) are genuine for a particular client 46 and then may provide access to the client 46 to one or more resources (36, 50) upon confirmation of the authenticity of the log-in identifier and password.

The central authentication module 34 may use encryption techniques and other security measures instead of or in addition to a password log-in identifier and a password, for example. Other security measures may include verification of a user's use of a log-on terminal, a log-on domain, and a log-on organization as conditions prior to the grant of access to one or more resources. Further, the directory services system 32 may restrict the extent that features or capabilities associated with resources are available to clients 46 or users.

In one embodiment, the central authentication module 34 may support an archive of error logs and success logs for defined time intervals (e.g., daily). Error logs represent a record of unsuccessful log-on attempts, which may be reviewed from the user interface 12. Success logs represent a record of successful log-on attempts, which may be reviewed from the user interface 12.

As shown in FIG. 1, the first resource 36 and the second resource 50 include a first security manager 38 and a second security manager 52. The first security manager 38 and the second security manager 52 may comprise security modules that are under the control of the central authentication module 34 of the directory services system 32. In one embodiment, the first security manager 38 may have a first set of passwords and log-in identifiers for granting access of one or more clients 46 to the first resource 36. Similarly, the second resource 50 identifier may have a second set of log-in identifiers and passwords for granting access of one or more clients 46 to the second resource 50. Accordingly, the first security manager 38 and the second security manager 52 may have different user names and different passwords for the same users, unless the first security manager 38 and the second security manager 52 are coordinated.

In an alternate embodiment, the central authentication module 34 may support a global password and global identifier that allows a user to enter the global password and the global identifier once from a client terminal 46 and obtain access to one or more resources (e.g., the first resource 36 and the second resource 50) without the necessity of the following: (1) re-entering a password and corresponding identifiers multiple times or (2) manually entering different passwords and different identifiers for the first access manger 38 and the second security manager 52.

A directory service system 32 may comprise a commercially available directory service such as LDAP (lightweight directory access protocol), network directory service (NDS), an Active Directory, and a X.500 ITU standard service. ITU refers to the International Telecommunications Union. LDAP supports resources such as e-mail addresses and printer addresses of a network. Lightweight Directory Access Protocol (LDAP) is a set of protocols for accessing information directories. LDAP is based, at least partially, on the X-500 ITU standard and supports TCP/IP for Internet-type communications. X.500 refers to an ITU standard that defines the structure of global directories in accordance with a hierarchical scheme. LDAP is compliant with at least a portion of the X.500 ITU standard. LDAP is an open protocol such that is compatible with different type formats and different servers hosting directory services. Access to a public key is from encryption is another resource that may be supported by a directory service.

NDS or Novell directory services is compliant with the X.500 standard. NDS provides a tree structure view of resources available via a communications network 22 so a user can access the resource through a convenient index. Network Directory Service (NDS) is used for Novell Netware networks.

An Active Directory is a directory service that is associated with a Windows 2000 operating system or another operating system available from Microsoft Corporation. Windows 2000 operating system is a trademark of Microsoft Corporation. In one embodiment the directory services system 32 comprises a light-weight directory access protocol (LDAP) compliant directory services system, such as a Windows 2000 Active Directory. Windows 2000 is a trademark of Microsoft Corporation.

The directory services system 32 may interact with the directory interface 30 via scripts or via data files that are placed in a certain data structure format. Scripts mean instructions or program modules, such as macros. In one embodiment, the directory interface 30 comprises a visual basic program or another program that is supported by an application programming interface associated with the directory services system 32. The directory services system 32 includes the central authentication module 34.

The directory services system 32 is invoked consistent with the contents of the received file or data structure 24 (e.g., an XML file). The received file refers to the file that was received by receiver 28. The directory services system 32 may apply an action to a directory service, such as the provision of access of a client 46 or user to a resource. The action may include a modification, deletion, or addition of attribute data associated with one or more of the following: the directory services system 32, the first resource 36, the second resource 50, a resource, an object, a user, and a group of users.

In an alternate embodiment, the directory service system 32 may be readily customized and scaled to support non-standard directory attributes or non-standard attributes of users or non-standard attribute values.

The system 10 may support multiple levels of security. In one embodiment, a primary level of security is provided by the central authentication module 34 or another security component of the directory services system 32. One or more secondary levels of security are associated with the security components (e.g., 38, 52) of corresponding applications or resources (e.g., 36, 50).

The central administration tool 14 allows an administrator to add new users to the directory services and new users to individual applications by means of a group membership. The group membership may be expressed as attribute data. If a user is moved to a directory services group, secondary security information or secondary application specific information is updated in a security component (e.g., 34) of the directory services system 32 and in a secondary security component (e.g., 38 or 52) associated with a resource. Where the applicable resource is an application, the secondary component data may be referred to generically as an application security store.

Figure 2:
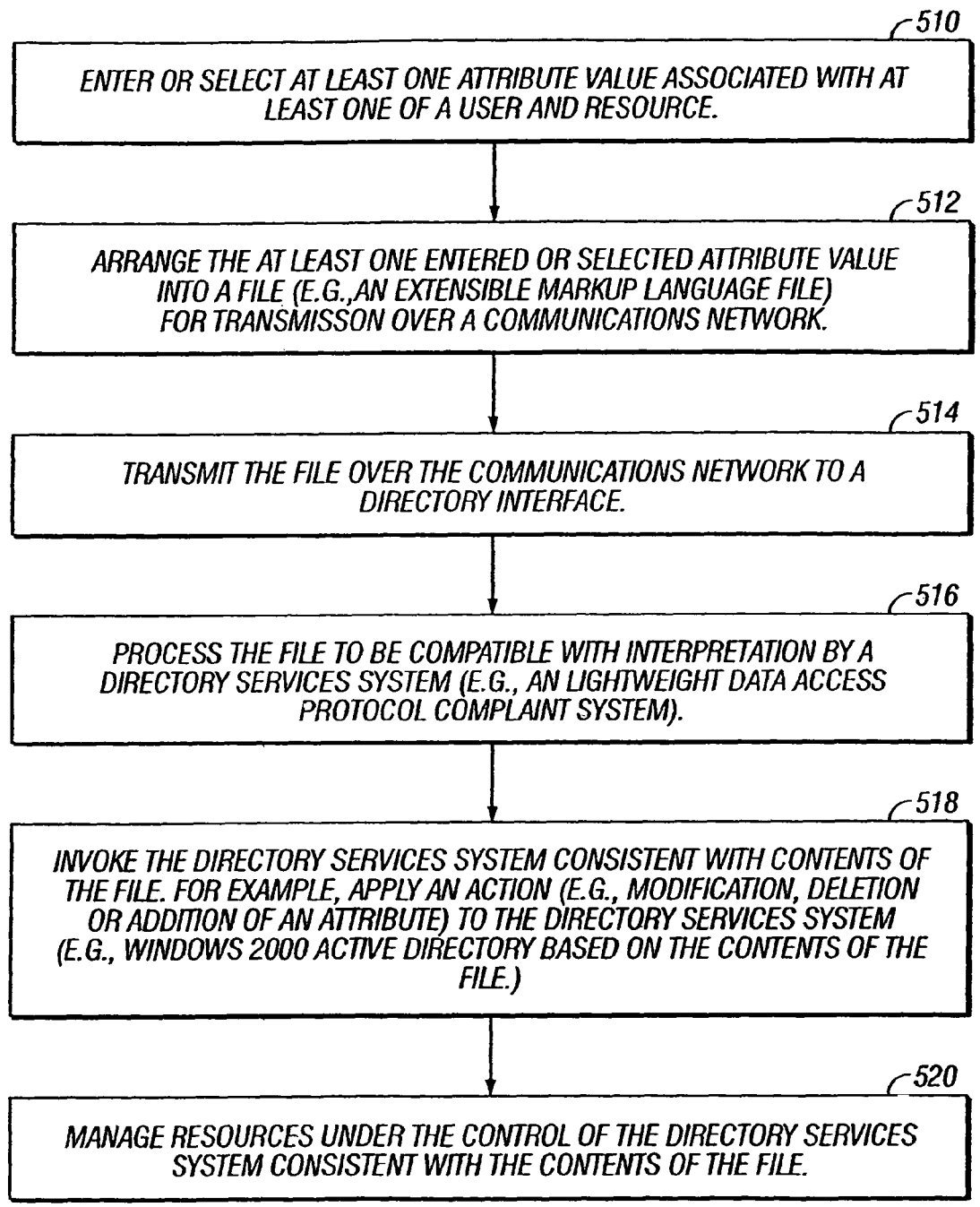
FIG. 2 is a flowchart of a method for central administration of one or more remotely-situated resources via a communications network in accordance with the invention.

FIG. 2 illustrates a method for central administration of one or more resources (36 or 50) from a central administration tool 14 in accordance with the invention. The method of FIG. 2 begins in step S10.

In step S10, a user enters or selects attribute data or an attribute datum (e.g., an attribute value) associated with the user, a resource, or both. Attribute data may define user attributes, resource attributes, or both. A resource may refer to one or more of the following: the first resource 36, the second resource 50, another resource, an object, a printer, a router, a server, a database, a network element, a computer program, and an application. The user may select or enter at least one attribute value or attribute from a user interface 12 coupled to the central administration tool 14. In one embodiment, the selection of an attribute data may occur by making entries on an electronic form or template that is displayable via the user interface 12. In such a case, the user interface 12 may comprise a browser (e.g., an Internet browser). In another embodiment, the user interface 12 supports a menu-driven format for entry of attribute data.

The displayable electronic form or menu-driven format of the user interface 12 allows an unsophisticated user to make entries in an error-free or accurate manner. Accordingly, the form or menu-driven entries may prevent or eliminate mistakes and allow less sophisticated employees to act as administrators or to participate in the administration of resources associated with clients 46.

User attributes include respective characteristics that are associated with a corresponding user or client. The attributes may be organized into a user profile that may comprise one or more of the following: (1) access data on accessing different resources for a particular user, (2) permissions for accessing associated portions of resources for a particular user, (3) configuration of user preferences for a particular user, and (4) configuration of user settings for a particular user. User preferences may include such features as the selection of a screen-saver for a user, the selection of display features for a user, the settings of events sounds for a user, the organization and storage of data files associated with the user, and software settings and installed software information associated with the user. Attributes may be associated with attribute values or selections to define a user profile.

Step S12 follows step S10. In step S12, the format converter-arranger 18 arranges the entered or selected attribute data (e.g., attribute value) for a user into a file (e.g., an XML file) or another data structure 24 for transmission over a communications network 22. The data structure 24 may comprise an extensible markup language (XML) file. XML refers to a specification that supports customized tags on the definition, transmission, validation, and interpretation of data between different applications or different entities. The extensible markup language file or another data structure suitable for transmission over a communications network 22 (e.g., Internet) is used. Other files that are suitable for the data structure 24 or transmission over a communications network 22 include hypertext markup language (HTML), standard generalized markup language (SGML), directory service markup language (DSML), or other applicable standards for files or documents.

HTML refers to a language for creating a document or file, which may be defined by tags and attributes.

SGML refers to a system of rules for organizing and structuring (e.g., tagging) elements of a document or a file. SGML supports the exchange of data between different platforms.

Directory service markup language (DSML) combines directory services with XML support to provide the technique for exchanging data between different platforms. Directory service markup language (DSML) may support LDAP-compliant directory services, a hypertext mark-up language (HTML) document, a standard generalized markup language (SGML) document, an extensible mark-up language (XML) document, or some other file format (e.g., an Internet-compatible file format).

The format of the document or data structure 24 may be specified in accordance with the document type definition (DTD). The document type definition may define how markup tags are interpreted by an application that forms or creates the document.

In step S14, the transmitter 20 transmits the file (e.g., data structure 24 (e.g., an XML file)) or another data structure over the communications network 22 to a directory interface 30. The file may be transmitted over the communications network 22, such as the Internet, consistent with a hypertext protocol standard (HTTP) or hypertext protocol standard secure (HTTPS) communications procedure, for example. The file (e.g., data structure 24 (e.g., an XML file) is transmitted over the communications network 22 to a server 26. The file may be transmitted to one or more servers (e.g., server 26) via the communication network 22.

The transmission of step S14 may be carried out in accordance with various alternate techniques. Under a first technique, the transmitter 20 or the central administration tool 14 transmits the selected attribute data to the affected resources in a group transmission to multiple resources. That is, the file or data structure 24 may be distributed to multiple servers simultaneously to efficiently update the affected resources. An affected resource refers to any resource in which an update or change in attribute data is present in the data structure 24. The first technique may be applied where an administrative account is assigned a global password and a global log-in identifier, for example.

Under a second technique, the transmitter 20 or the central administration tool 14 transmits the selected attribute data in each affected resource in a series of separate transmissions (e.g., sequentially) to multiple resources. The second technique may be applied where an administrative account is not assigned a global password and a global log-in identifier, for example. In one embodiment, a global password and a global log-in identifier may be incompatible with the restrictions imposed on administration of certain resources.

Step S14 allows operation and maintenance of one or more servers or resources to be executed remotely from the user interface 12 of central administration tool 14. Accordingly, for many operations and maintenance tasks, the administrator does not need to be on-site where the server 26 is to configure or service the server 26 or associated resources (e.g., applications).

In step S16, a directory interface 30 processes the file to be compatible with interpretation by a directory services system 32 after the receiver 28 receives the transmitted data structure 24 (e.g., an XML file) via the communications network 22. For example, the directory interface 30 processes the file to be compatible with interpretation by a lightweight directory access protocol (LDAP) compliant system. The directory interface 30 may parse the received file or data structure 24 (e.g., an XML file) to place the components of the data structure 24 (e.g., an XML file) into a format that can be interpreted by a lightweight directory access protocol compliant (LDAP) directory service.

In step S18, the directory services system invokes an action consistent with the contents of the file. In one example, the action may comprise definition, modification, deletion, or addition of an attribute or an attribute value to the directory services system 32. In another example, the action may comprise one or more of the following activities: management of security measures for one or more users; provision of access to software programs, features, or capabilities for one or more users; and the management of resources for one or more users.

A directory services system 32 may support security measures for authentication of users in groups associated with the network. For example, the directory services system 32 may prevent access of an unauthorized user or client 46 to one or more resources. In addition to providing support for security measures for clients 46, users, and resources (36, 50) associated with the communications network 22, the directory services system 32 may also support the provision of application programs and resources with a desired future set, as defined by attributes and attribute values of a user.

A directory service system 32 refers to a service that identifies resources (36, 50) associated with a communications network and accessibility measures for making the resources (36, 50) accessible to clients 46, users and applications. Resources may include, but are not limited to, e-mail addresses, computers, network elements, and peripheral devices (e.g., printers). The directory service system 32 may support a physical network typology and protocol that are transparent to a user, a user or a client 46 on the network can access any resource (36, 50) without knowing where or how it is physically connected to the communications network 22.

The directory services system 32 may support security measures for users, resources, and groups associated with a communications network 22. Directory services may also support management of attributes, security measures and attribute values associated with users of the communications network 22. The directory services 32 may provide access of users or clients 46 to resources associated with a communications network 22. To this end, directory services system (e.g., 36, 50) may provide an index, a table, a search engine or other organization for supporting the selection of user resources via the communications network 22.

The action associated with the directory services system 32 may be performed consistent with several different procedures. In accordance with one procedure, the directory services system 32 implements a security procedure where a user or user group is authenticated for access to a resource (36, 50). The authentication may be provided by a log-on procedure, an encryption procedure or other security measures.

In accordance with another procedure, the directory services system 32 may support confirmation of the identity of a user trying to log-on in a certain domain and the provision of access to resources associated with the communications network 22. For example, the resources may include, but are no limited to, data, applications, physical devices, printers, computers, servers, and network elements.

In accordance with another procedure, directory services system 32 may support user authentication of a user and a single entry of a log-in identifier and a password to provide access to multiple resources (e.g., applications) on the communications network 22 without requiring more than one entry of the password and log-in identifier. The directory services may support the assignment of attributes and attribute values to corresponding users. Attribute values may include user rights, permissions and control permissions for interacting with resources or objects. An object may be associated with object attributes. The objects may include limitations on the control presentation manipulation and access of objects, for example.

In step S20, an administrator at the user interface 12 may manage resources (e.g., applications) under the control of the directory services system 32 consistent with the contents of the transmitted file. A directory service system 32 may identify one or more resources (e.g., 36, 50) available for at least one client 46 or user associated with a network. The directory service system 32 may support the assessing of the resources for the client, users, and applications to manipulate (e.g., add, delete, or modify) attribute data. For example, a resource may include one or more of the following items that are associated with a network: an e-mail address, an address of a printer, an address of a server, an address of a router, an address of a data packet switch, an address of a peripheral device, and an address of a network element.

The directory services system 32 or an affiliated data processing system (e.g., a transaction server) interprets the transmitted file. The management may include one or more of the following: (1) changing user attributes or attribute values associated with users or at least one resource, (2) establishing user templates for creating new users or additional users, (3) establishing templates or establishing new groups of users, (4) making changes to groups of users simultaneously, and (5) provisional security access to resources accessible via the communications network 22.

The central administration tool 14 is configured to support one or more security management components, including a security component (e.g., a central authentication module 34) of the directory services system 32, a first security manager 38, and a second security manager 52. The security management components facilitate authentication and authorization procedures for managing access of users to resources associated with the network.

In one embodiment, the server 26 may place selected documents in a database 42. A database manager of the database 42 and a security component may assign user rights and group rights to accessing or editing corresponding data in the database 42.

The method of FIG. 2 and the central administration tool 14 support the ability of an administrator to administer and manage multiple applications and security modules from a central location such as the site of a central administration tool 14. The central administration tool 14 supports the ability to allocate storage and security storage for one or more applications. The security storage or allocated storage for different applications may be segregated among one or more servers or otherwise. The user interface 12 and the central administration tool 14 may support the transmission and communication of a file or document via a communications network 22, such as the Internet. Where the central administration tool 14 is compatible with the Internet, the central administrative tool may be used to control a variety of servers and/or resources associated with the communications network 22, regardless of where the servers 26 and/or resources are physically located. For example, the central administrative tool 14 may be located remotely in a geographically separated location.

Figure 3:
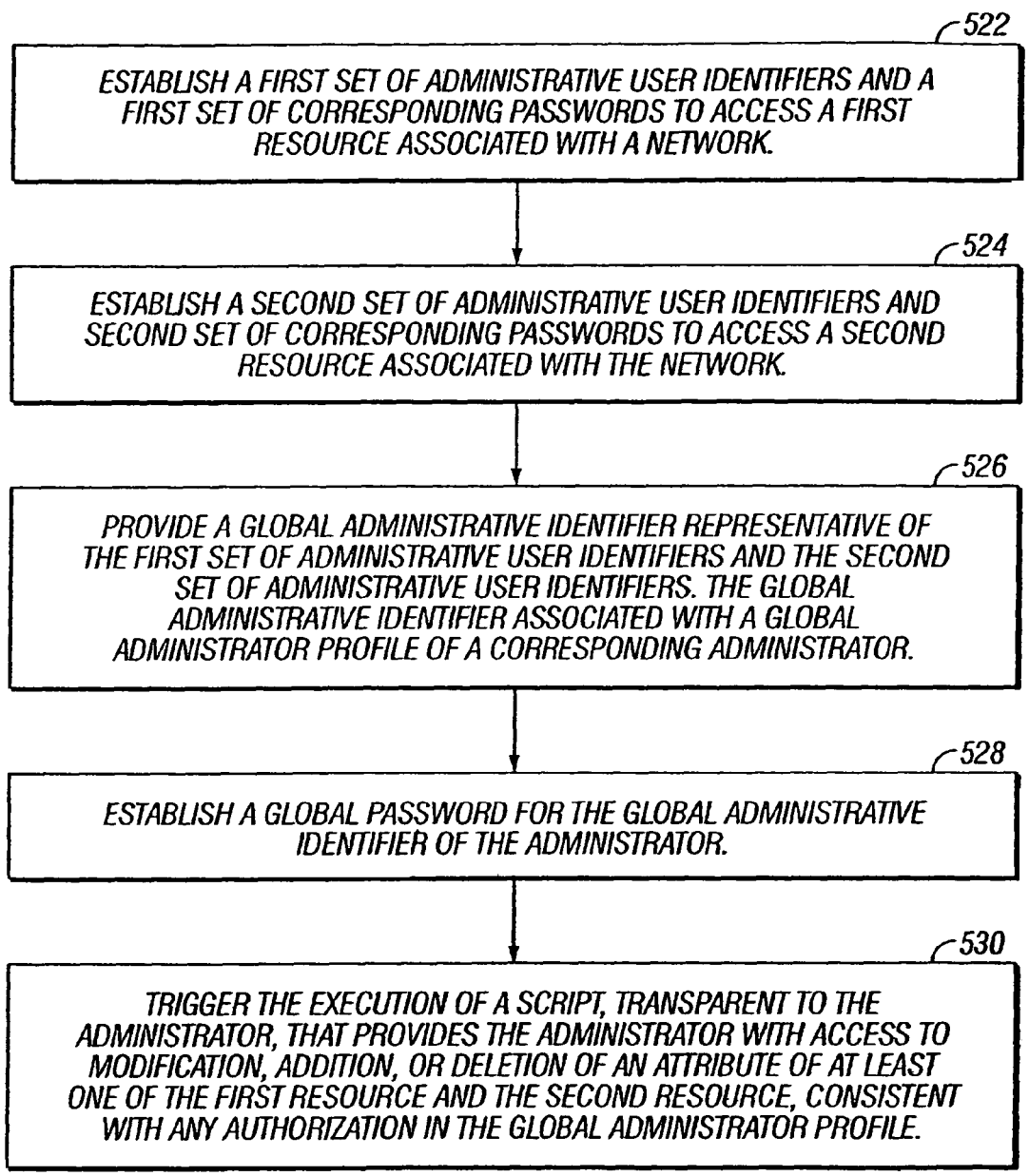
FIG. 3 is a flowchart of a method of managing the security aspects associated with the administration of a client-server data processing system or network in accordance with the invention.

FIG. 3 describes a method for providing security authorization and authentication for at least one administrator at a central administration tool 14 associated with the communications network 22. The method of FIG. 3 starts in step S22.

In step S22, a first set of administrative user identifiers and a first set of corresponding passwords is established to support access on an administrative level to a first resource 36 allocated within a communications network 22. Access on an administrative level may refer to the capability to modify, delete, or add attribute data.

In one embodiment, the first security manager 38 and the security controller 19 supports the first set of administrative user identifiers and the first set of corresponding passwords. The first resource 36 may comprise a knowledge management system or another type of resource. For example, the first resource 36 may comprise a lightweight-directory-access-protocol compliant knowledge management system.

In step S24, a second set of administrative user identifiers and a second set of corresponding passwords is established to support access on an administrative level to a second resource 50 associated with the communications network 22. The second security manager 52 and the security controller 19 support the second set of administrative user identifiers and the second set of corresponding passwords. In one embodiment, the second resource 50 comprises a knowledge management system. For example, the second resource 50 comprises a filenet document center.

In step S26, a global administrative user identifier is provided to represent the first set of administrative user identifiers and a second set of administrative user identifiers. The administrative global user identifier is associated with an administrative global user profile of a corresponding administrator. The global administrative user identifier may be displayed to an administrator of a user interface 12 coupled to a central administrative tool 14.

In an alternative embodiment, the global user identifier may be transparent to the administrator and the administrator may enter a user identifier selected from the first set or the second set of administrator identifiers.

In step S28, a global password is established for the global administrator identifier. The password may be assigned by entry of an administrator into the user interface 12. In one embodiment, the password may be dynamically updated on a regular or a random basis to improve the robustness of the security measure. At the user interface of the central administration tool 14, the administrator may be required to enter both the administrative user identifier and the corresponding global password to obtain access on an administrative level to one or more user resources. The resources that the user can gain access to may be defined by user attributes or a set of administrative user attributes and values defined by an administrative user profile. Accordingly, in one example, if the administrator enters the proper global user identifier and corresponding global password, the administrator is automatically granted access on an administrative level to a set of resources as defined by the corresponding administrative user attributes. The set of resources may reflect an administrative preference or selection of a corresponding administrator.

In step S30, the administrator may enter the global user identifier and the corresponding global password into the client 46 terminal to get access on an administrative level to one or more desired resources. In one embodiment, the access is granted by executing a script which is transparent to an administrator. In one example, the script supports access to at least one of a first resource 36 and a second resource 50 consistent with any authorization in a global user profile. The global administrative user profile may define access to user attributes and corresponding attribute values that differ from one administrator to another. A script is another term for a set of instructions, such as a macro or a batch file. A script may contain a listing of commands that may be executed without the intervention of a user. Scripts may be written in various programming languages.

In one configuration, the central authentication module 34 has a third set of administrative user identifiers and corresponding passwords. Further, the global password and the global identifier are arranged to log the administrator into a directory services system 32 associated with the central authentication module 34. The administrator logs into the directory services system 32 at an administrative level, which allows greater capabilities and security privileges than a user level of a client 46.

After the administrator's entry of the global administrative identifier and global password via the user interface 12 and the administrator's successful log-in at the administrative level, the server 26 may read the contents of a data structure 24 transmitted from the central administrative tool 14. The data structure 24 allows the administrator to modify, delete, or add an attribute of one or more resources (36, 50) on an administrative level in as few as one transaction required to form the data structure 24.

Figure 4:
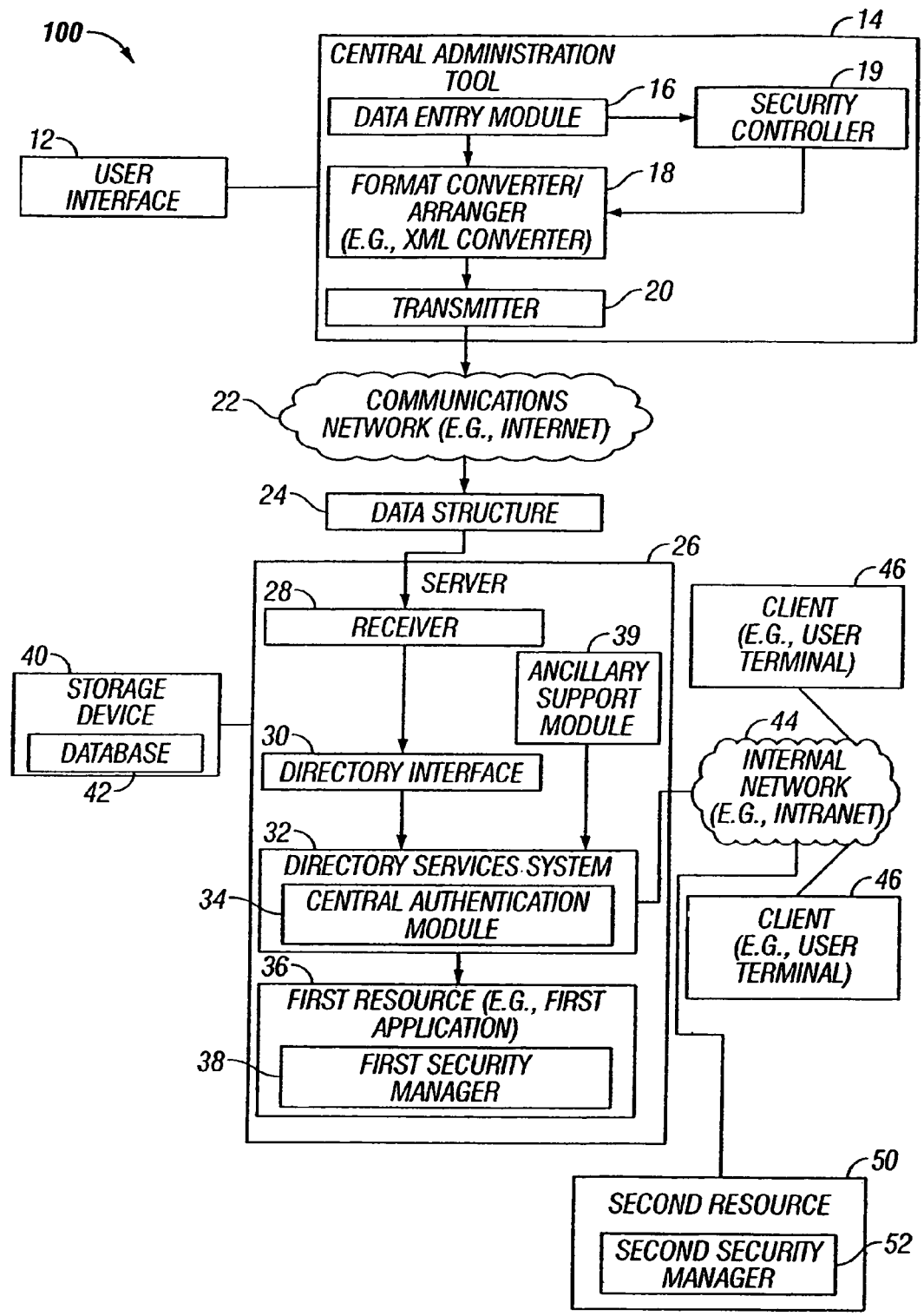
FIG. 4 is a block diagram of another embodiment of a system for administering one or more resources of a client-server data processing system in accordance with the invention.
Figure 5:
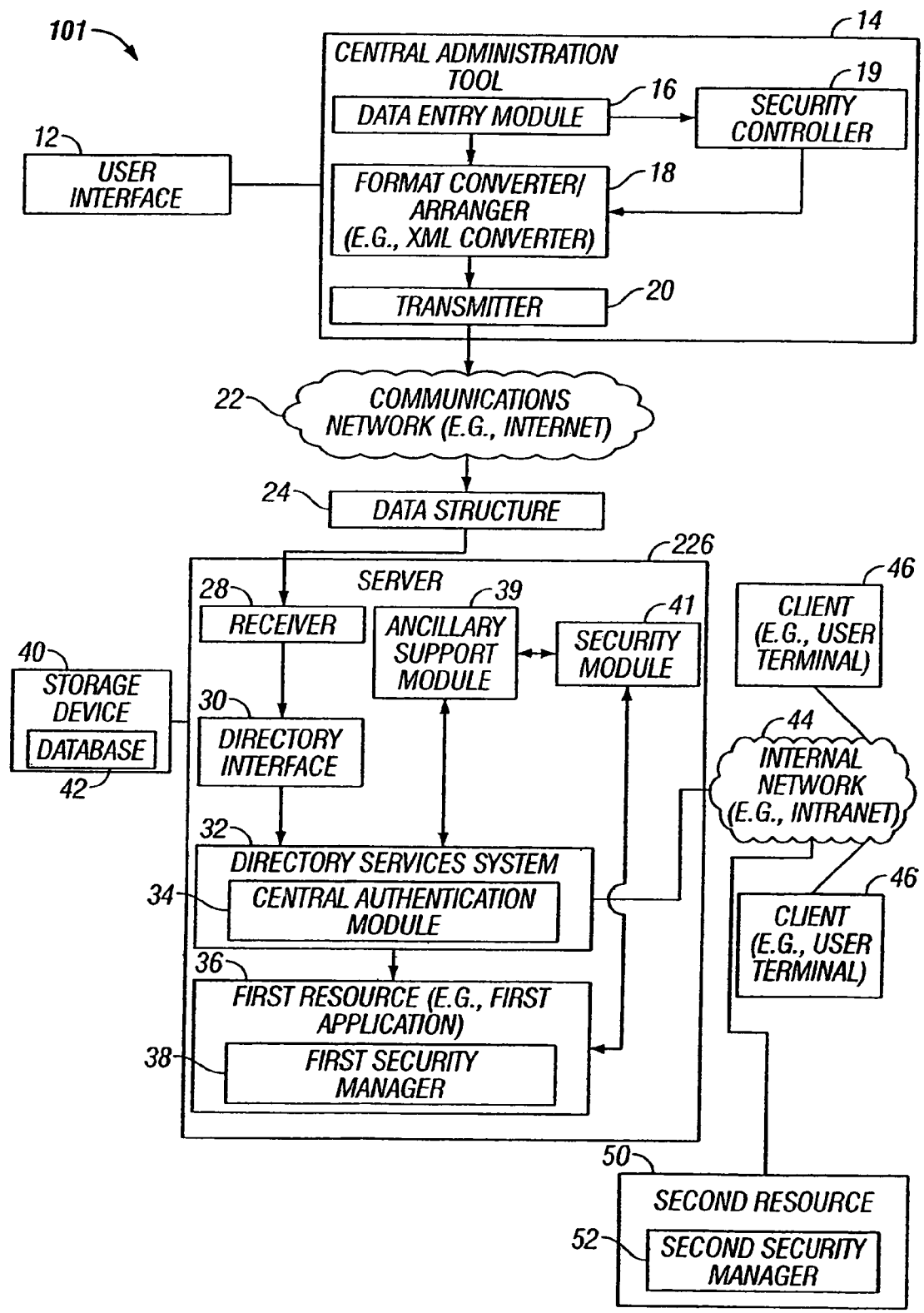
FIG. 5 is a block diagram of yet another embodiment of a system for administering one or more resources of a client-server data processing system in accordance with the invention.
Figure 6:
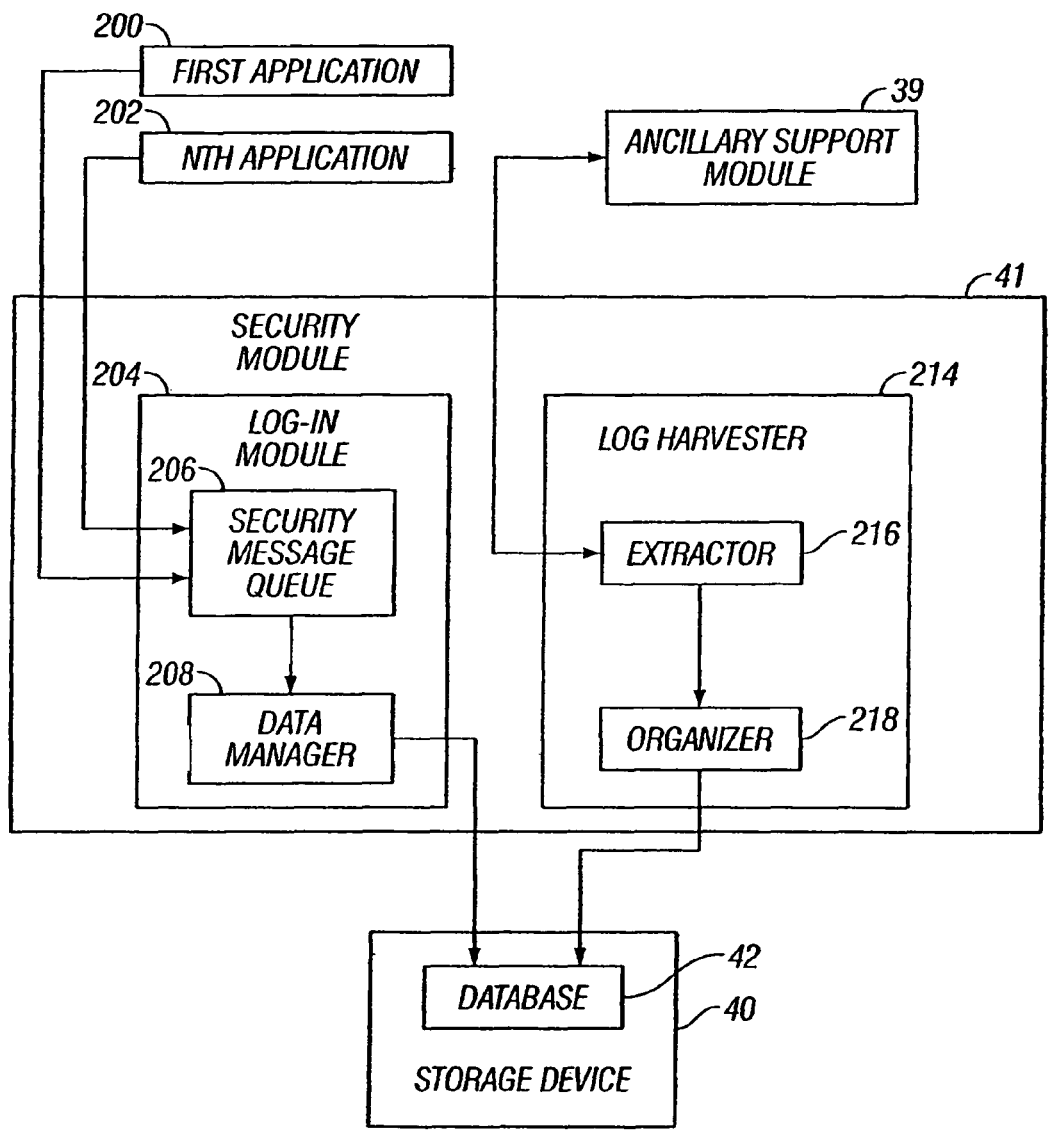
FIG. 6 shows an illustrative embodiment of a security module in accordance with the invention.

FIG. 4 shows an alternate embodiment of client-server data processing system 100. The client-server data processing system 100 of FIG. 4 is similar to the client-server data processing system 10 of FIG. 1, except the server 126 of FIG. 4 further comprises an ancillary support module 39. Like reference numbers in FIG. 1 and FIG. 4 indicate like elements.

The ancillary support module 39 may support enhanced features of the directory services system. The ancillary support module 39 may support one or more applications or systems. For example, the ancillary applications module 39 may comprise one or more of the following: a knowledge management application (e.g., Plumtree Corporate Portal, Plumtree Document Directory, or an Eprise Participant Server), a corporate portal application, and a communications application (e.g., filenet communications for access to data associated with a UNIX operating system environment).

The directory services system 32 may be integrated or enhanced by the ancillary support module 39 such that the directory services system 32 support the provision of one or more of the following to clients 46: links to documents, web pages or other resources in an index, a table of contents or a topical hierarchy. In one embodiment, the topical hierarchy may be searchable or browsable.

The integration of the ancillary support module 39 with the directory service system 32 may support the display of a personalized home page, personalized community portal page, an enterprise portal page, an intranet portal page or the like once the user or client 46 is authenticated and authorized. For example, if the global user identifier and corresponding global password are entered by a client 46 for user-level access, the global user or client 46 may be taken to a personalized home page on the Internet that lists a directory of all of the resources that the user or client 46 may access. In the presented directory at the client 46, the resources may be indexed in topical arrangements in alphabetical order or may be otherwise searchable by one or more key words. The information in the home directory or personalized portal of the client 46 may include the last accessed documents or resources via the communications network 22.

Document attribute data may include dates or creation of the document or last updating of a document that is displayed on the home page or home portal. In one embodiment, the document attribute data may comprise historical access or use data. At the client 46, the portal or start-up page may include an index of last used files and the storage location of the last used files on a storage device 40 associated with the communications network 22.

A first application 200 through an nth application 202 provide reports of security data (e.g., application security data) to the security message queue 206. The first application 200 represents an illustrative example of the first resource 36. Similarly, where a total of two applications are present (i.e., n equals 2), the nth application 202 represents an illustrative example of the second resource 50. The security message queue 206 of the log-in module 204 collects security data on clients and network usage. The security message queue 206 holds the security data until the security data is processed.

A data manager 208 extracts security data from the security message queue 206 to prepare the extracted security data for storage in a database 42. The data manager 208 may extract the security data in accordance with the time of receipt or order of receipt of the security data into the security message queue 206, or in accordance with another priority scheme.

A log harvester 214 is an interface that supports centralized logging of application information, rather than distributed or decentralized logging within each specific application. In one embodiment, the log harvester 214 comprises an extractor 216 that extracts security data from an application (200, 202) or resource associated with the ancillary support module 39. The extractor 216 or the log harvester 214 may parse one or more existing applications log files to extract relevant security data. The relevant security data may be selected from the application information based on a priority scheme of the security data, a sorting algorithm, or a filtering algorithm. The log harvester 214 or the organizer 218 organizes the extracted (e.g., parsed information) into a log file that is compatible with centralized storage in the database 42.

FIG. 7 through FIG. 18, inclusive, show illustrative display screens of the user interface 12 from the perspective of an administrator. The user interface 12 may support a keyboard and a pointing device, such as a mouse for making entries, selections, or otherwise interacting with various display screens.

Figure 7:
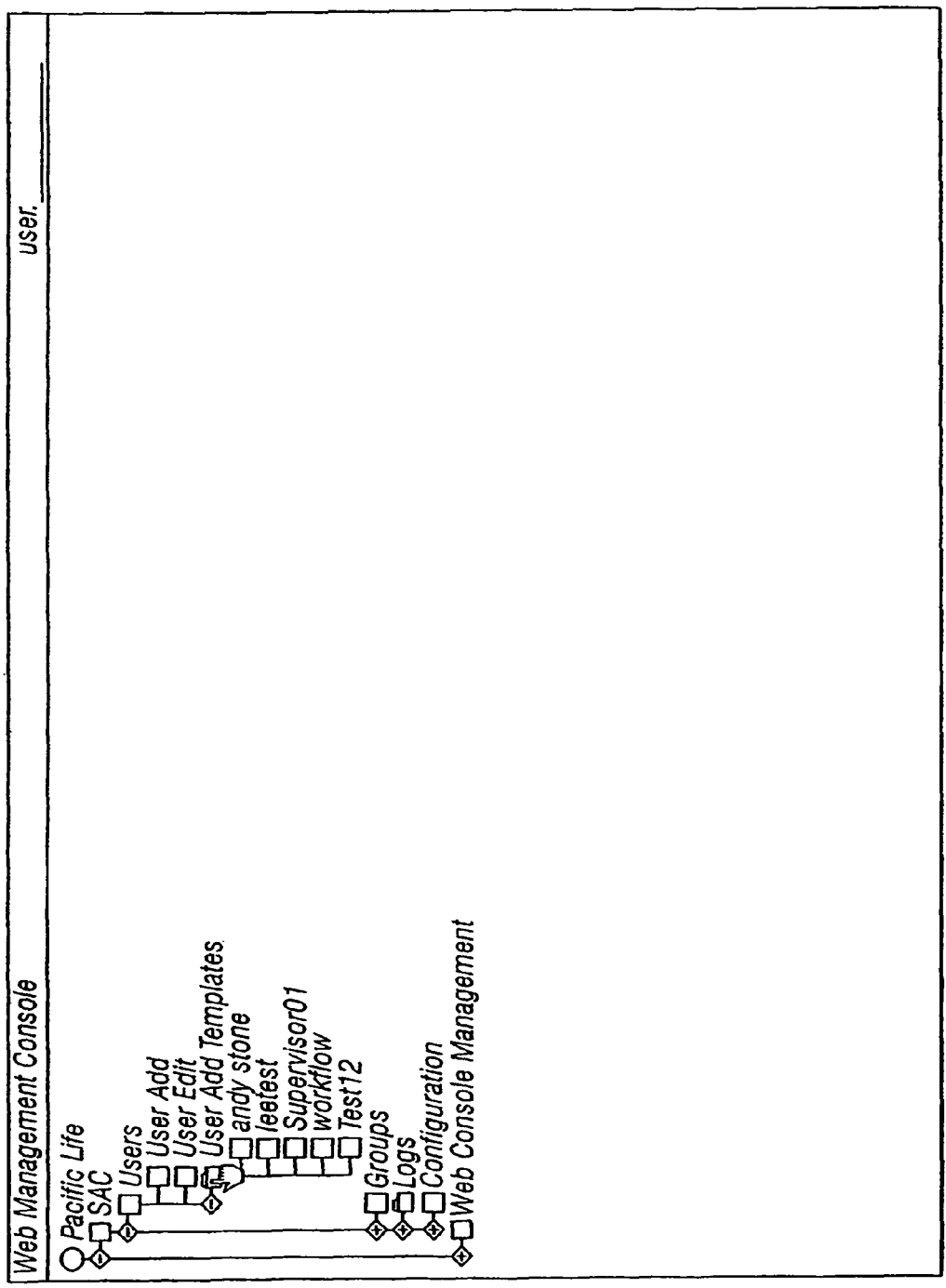

FIG. 7 illustrates a menu presented to an administrator of the user interface 12 at the central administration tool 14. In particular, an administrator has selected a "User Add Templates" heading with a pointing device, as indicated by a hand symbol on the display. In response, the display screen of the user interface 12 displays a list of user templates. In the example of FIG. 7, the user templates are labeled as follows: "andy stone, leetest, Supervisor01, workflow, and Test12." The administrator can select a user template that has the closest attributes or profile to a new user when adding a new user to the client-server system. The administrator can then modify the attributes of the user template to conform to the requirements, attributes, or profile associated with the new user.

FIG. 8 illustrates a user template for an illustrative user who is called "Andy Stone." The user template includes one or more of the following fields: first name, initials, last name, display name, common name, description, office, telephone, e-mail, and web page. The user template may include further fields or attributes of the user "Andy Stone" or another illustrative user if the "Next>" button on the lower right corner of the screen were pressed. The "Save As Template" button on the lower left corner saves the information as a template for future reference.

Figure 9:
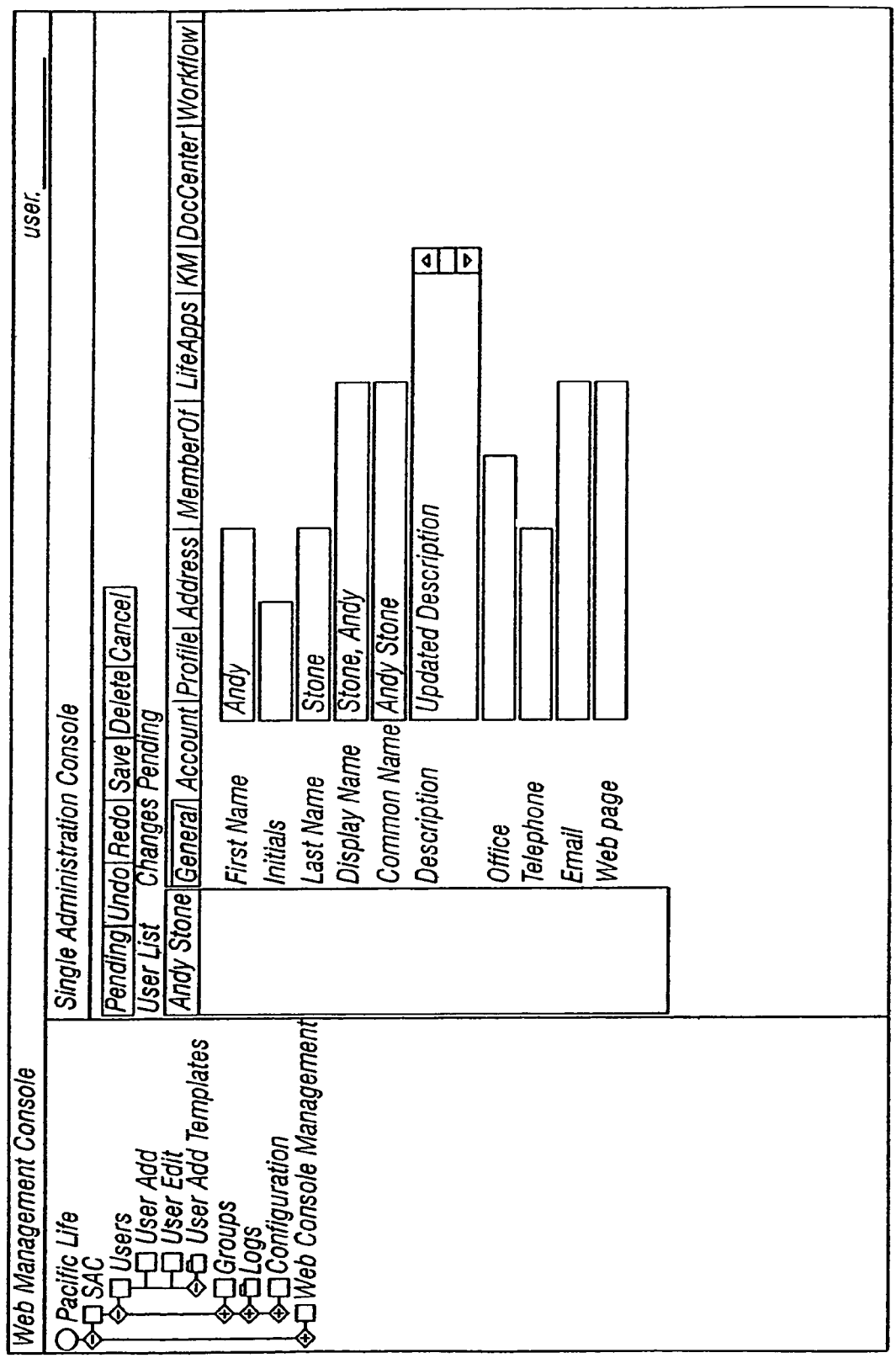

FIG. 9 illustrates an administrator's revising the previous user template of FIG. 8. The administrator has previously deleted the information from the following fields: office, telephone, e-mail, and web page. The user is now changing the data in the description field from "test" in FIG. 8 to "updated description" in FIG. 9. The user interface 12 cooperates with the data entry module 16 and the format converter/arranger 18 to form an data structure 24, such as an XML file for transmission to the server 26 where the directory interface 30 and the directory services system 32 can process the data structure 24.

Figure 10:
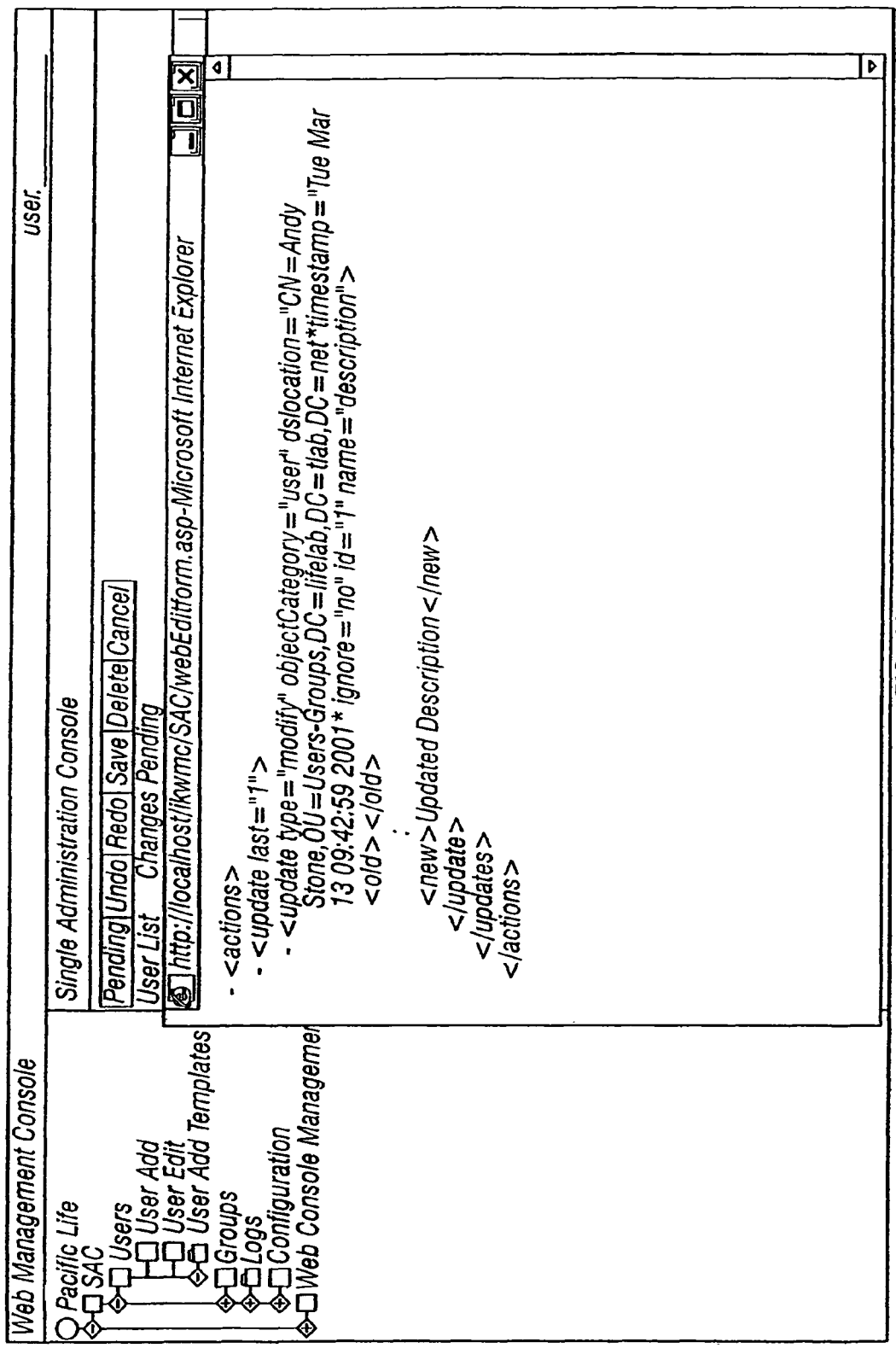

FIG. 10 illustrates an illustrative data structure, representative of data structure 24, which is formed in response to the update of the description field from "test" to "Updated Description." The illustrative data structure of FIG. 10 may conform to the characteristics of an XML file or another data format.

Figure 11:
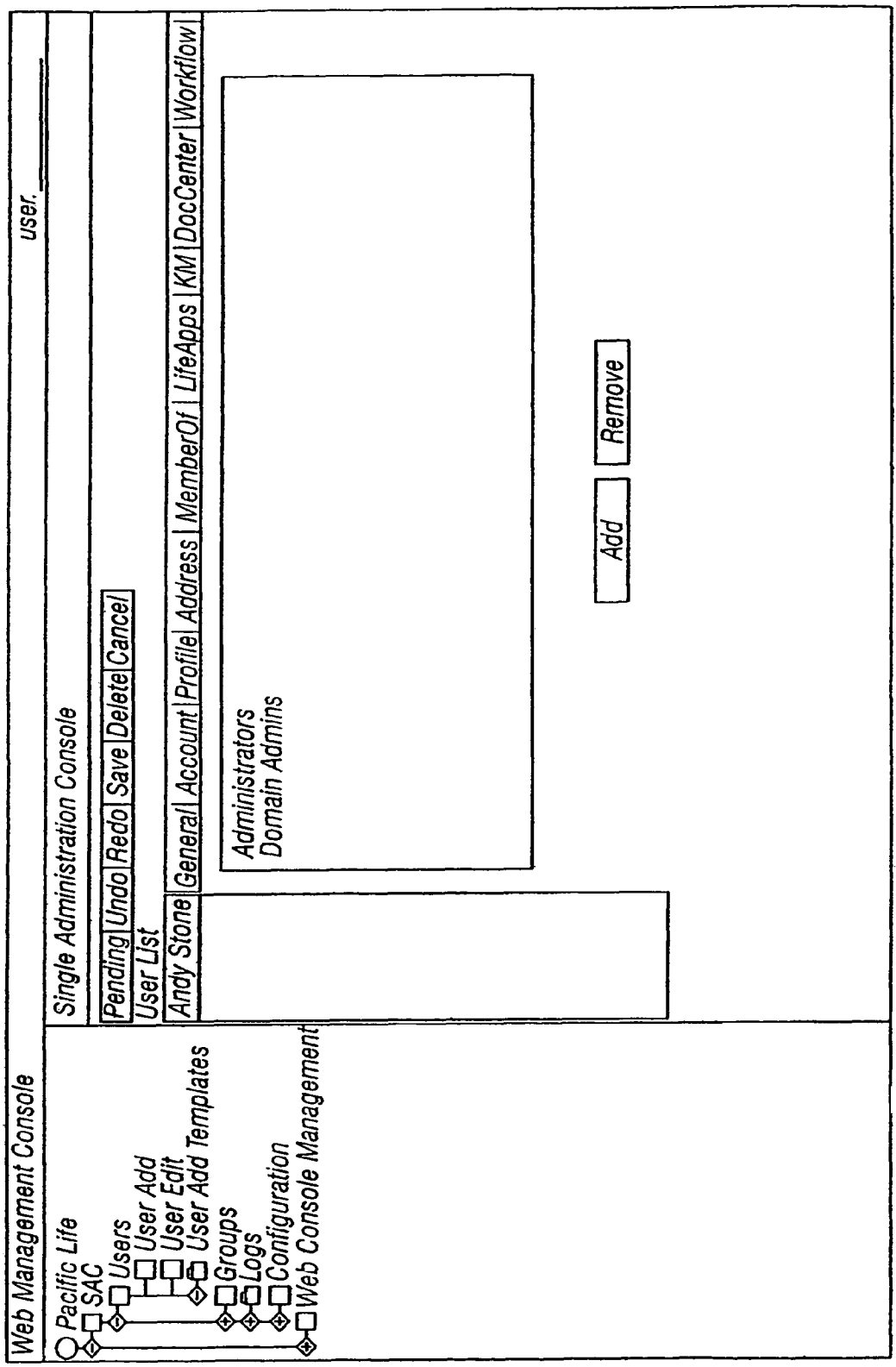

FIG. 11 illustrates a display that shows a list of groups in the right box and a user identifier in the left box. The left box has the heading "user list". The user identifier (e.g., Andy Stone) in the left box may be assigned a membership in one or more of the groups in the right box. As shown, the user identifier is "Andy Stone" and the groups to which the user Andy Stone may be assigned are "Administrators" and "Domain Admins". From the user interface 12, an administrator may highlight or otherwise select a group from the group list, and press the add or remove button to assign or remove the user from the selected group.

Figure 12:
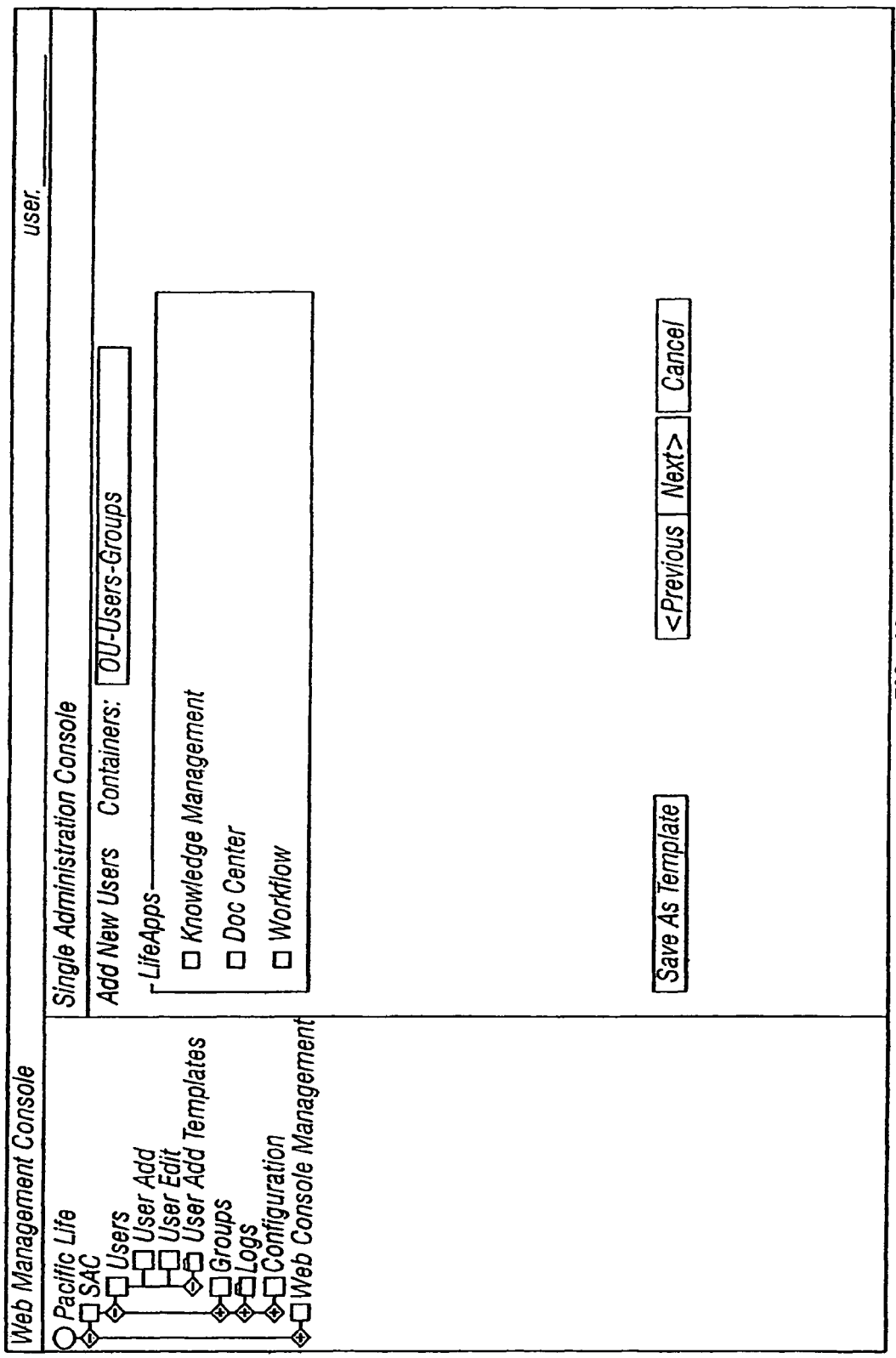

FIG. 12 illustrates a display screen of applications or resources which may be associated with a user, a group, or both. The user or administrator may assign access of a selected user or a selected group to one or more applications by checking a box or otherwise selecting applications from a list. The applications are collectively labeled "LifeApps" and include "Knowledge Management", "Document Center", and "Workflow". Although specific examples of application identifiers (e.g., "Knowledge Management") are shown in FIG. 12, in practice any application or application identifier may be presented on the display screen within the scope of the invention.

The "Knowledge Management" application may support data storage and retrieval (e.g., queries) with respect to a database.

The "Document Center" application may include one or more of the following user profile or attribute fields for each corresponding user: a primary group, an account expiration date, an access level or functionality level within the "Document Center" application, a domain identifier, a maximum number of allowable unsuccessful log-on attempts, an organization affiliation, and a maximum number of permitted or licensed users. The primary group may be assigned to a user where the user is a member of more than one user group.

The "Workflow" application may include user attributes on whether a user is eligible to receive a new work, the identify of the user's supervisor, and other user information.

Figure 13:
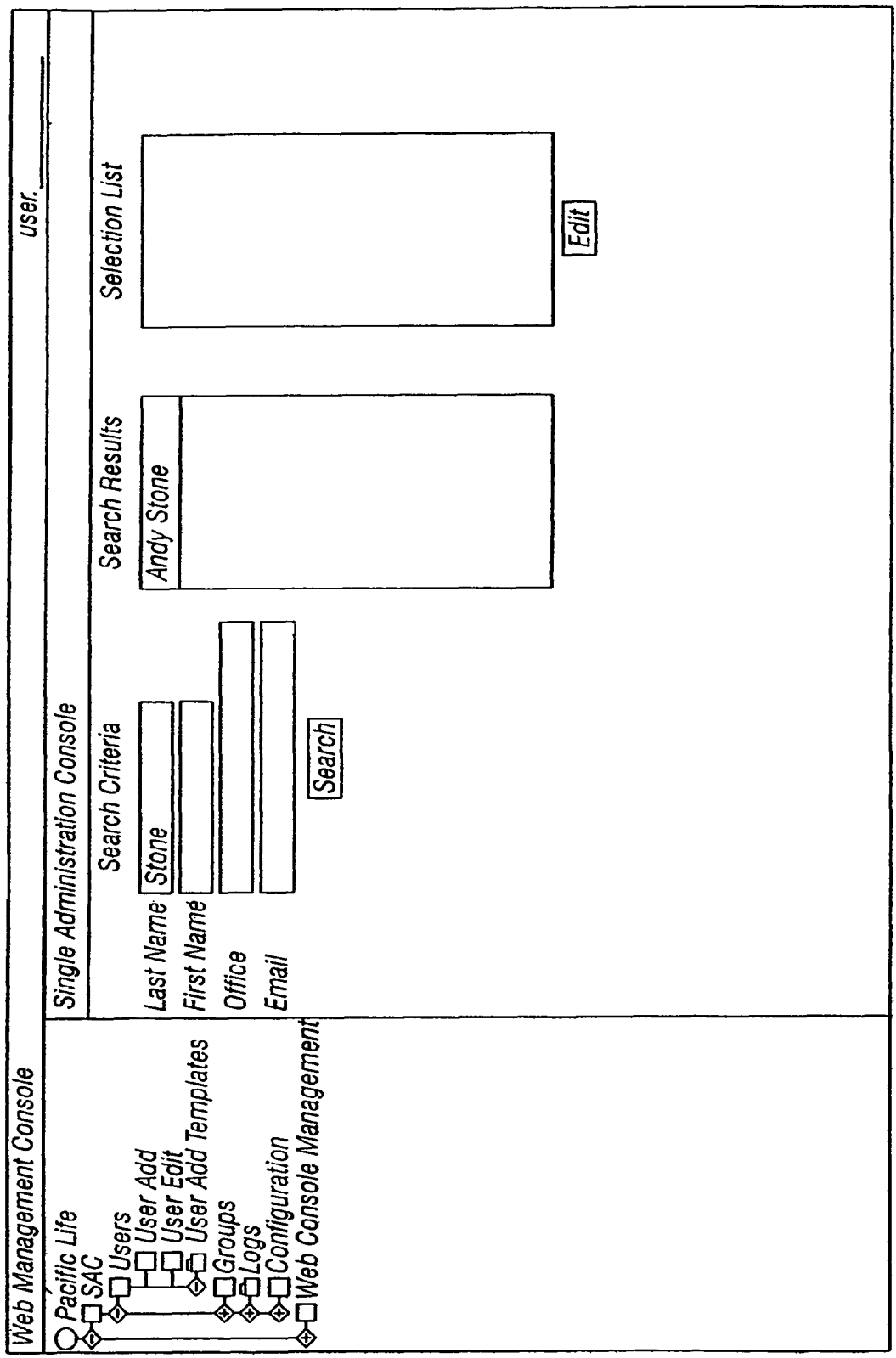

FIG. 13 illustrates a display screen where the administrator searches for a user based upon an entry of one or more of the following search criteria: last name, first name, office, and e-mail address. The search results are provided in the box, labeled search results. In the illustrative example of FIG. 13, the administrator enters the search criteria, which is the last name of "Stone", and presses the search button. The user interface 12 displays the result obtained as "Andy Stone".

FIG. 14 is a display screen of a user group and the attributes associated with a user group. The group attributes include one or more of the following: group name, description, e-mail address, application access (e.g., "LifeApp"), and membership identity. The administrator may assign attribute values to the group attributes and then save the group as a template. The template can be used to form new groups that have similar attribute values to a selected template that is stored by the central administration tool. Accordingly, in at least some situations the user may save time in administering groups by retrieving templates and making only slight modifications to establish new user groups.

Figure 15:
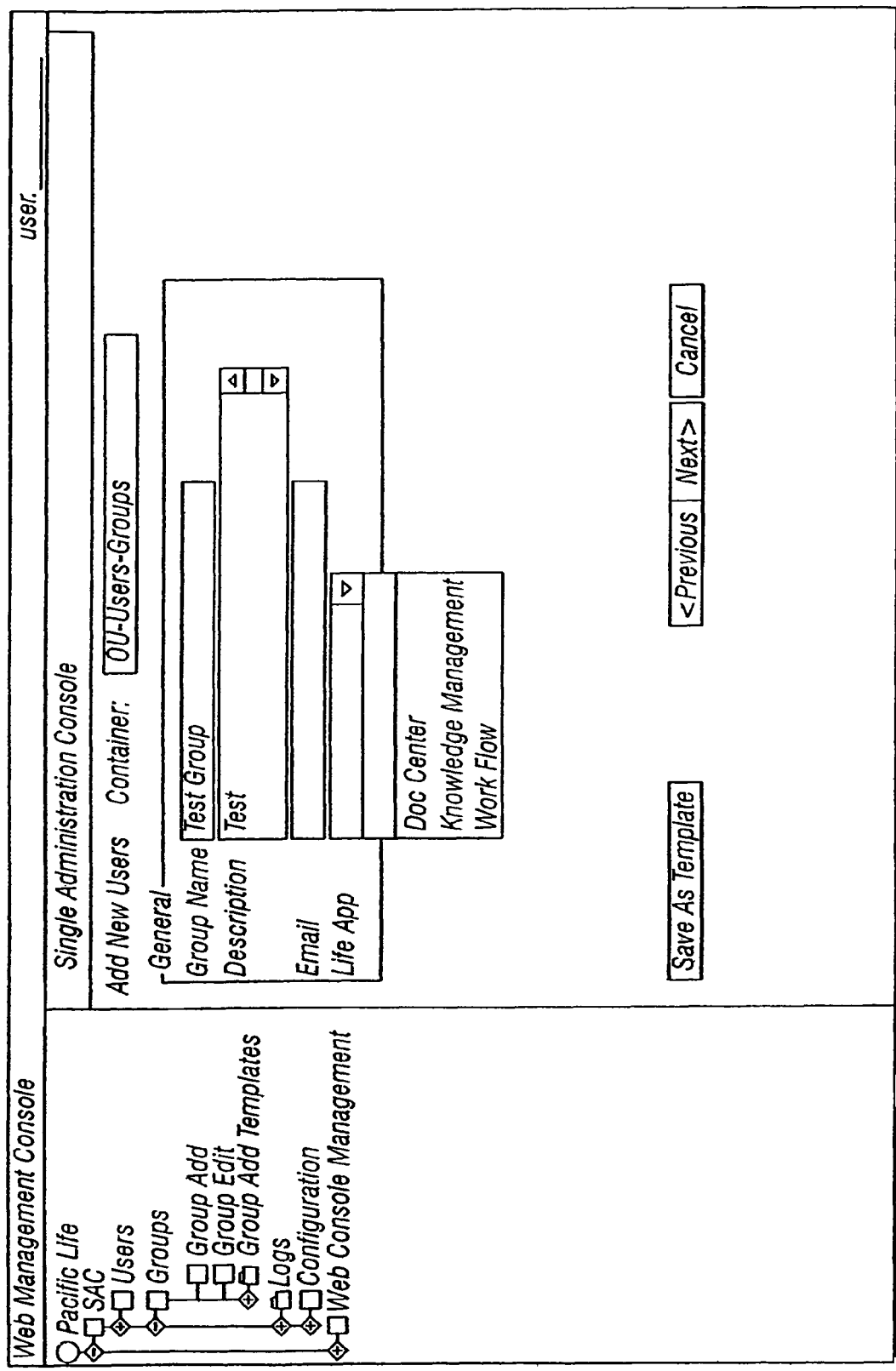

FIG. 15 illustrates that user groups may be affiliated with applications access. All of the members of the group may be assigned at least the same level of minimum access to one or more applications. For example, as shown in FIG. 15, an administrator may assign a group access to one or more of the following applications: "Document Center, Knowledge Management, and Work Flow." The application access associated with each group may be saved as a group attribute by pressing the button labeled "Save As Template."

Figure 16:
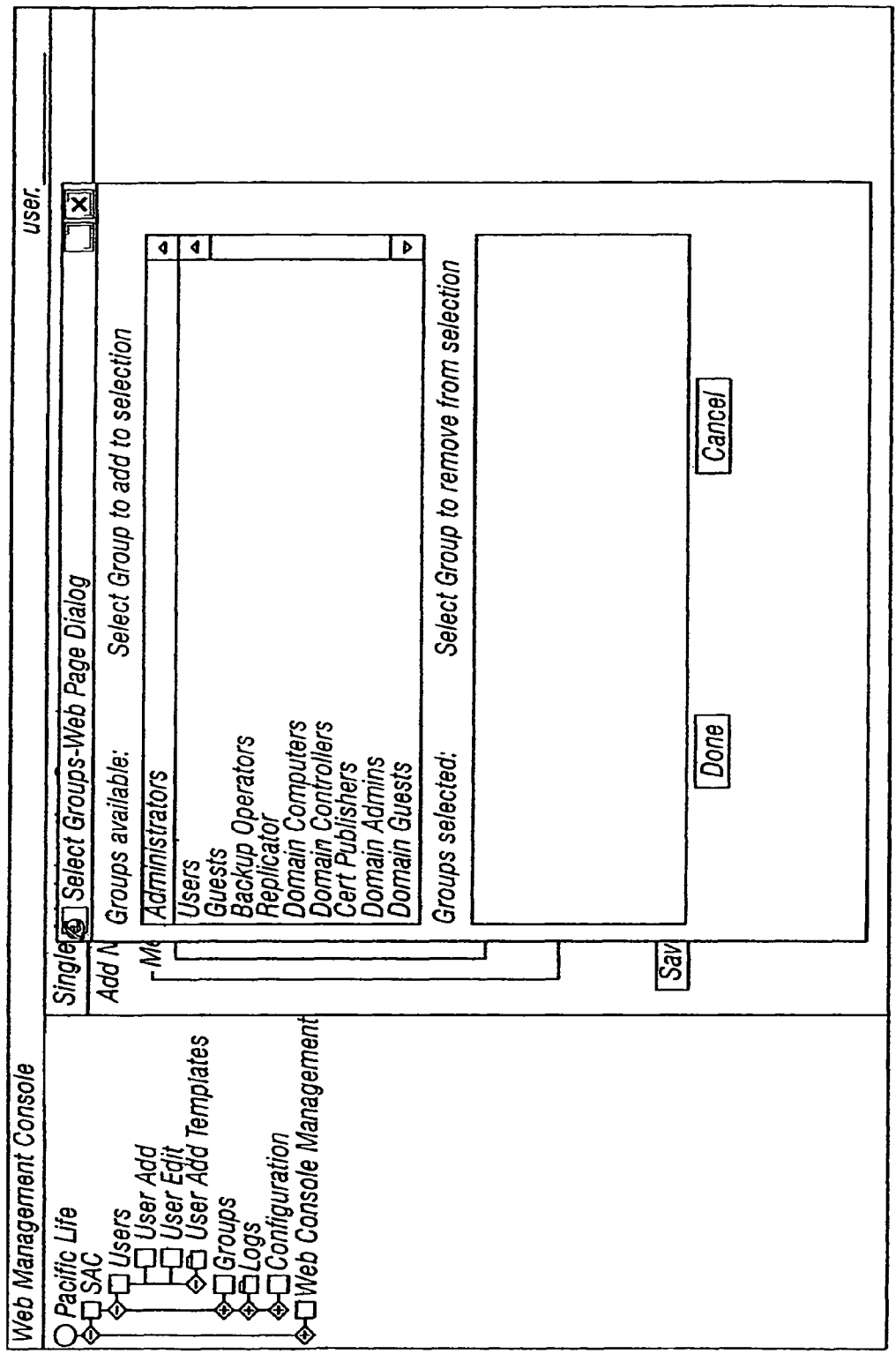

FIG. 16 illustrates a display screen that displays a list of available groups. The administrator may browse through the available groups to select a group for further action, such as creation of a new group or modification of group attributes.

The central administration tool 14 and method of the invention provides an administrator with a centralized management tool 14 to manage one or more resources (e.g., administer application security for client-server applications). The central administration tool 14 uses a directory services system 32 (e.g., Windows 2000 active directory) to centralize the security data. The central administration tool 14 and method is compatible with transmission, reception or communication of files or documents over the communications network 22 (such as the Internet) to permit remote management and an administration of client-server applications and other resources associated with the communications network 22. The central administration tool 14 supports user maintenance, group maintenance and is customizable to interact with one or more applications.

The central administration tool 14 is scalable to handle multiple applications or multiple servers. In one embodiment, the central administration tool 14 provides an XML file for conveying instructional messages to a server 26 or a processor associated with a resource. Advantageously the central administration tool 14 can manage multiple applications and multiple resources that are widely, geographically disbursed. Accordingly, travel time to different locations to administer remotely situated servers 26 may be eliminated or greatly reduced to reduce to the expenses of administration and management of resources. Accordingly, an administrator can maintain the network and its resources from virtually anywhere in the world where the central administration tool 14 is located and Internet access is available. Further, a user may be able to create and save custom templates. The custom template may be used to create one or more users or one or more groups to automatically apply a default attribute or a default permission associated with the user or group. A user may require two or more user identifiers associated with corresponding communication systems.

Figure 17:
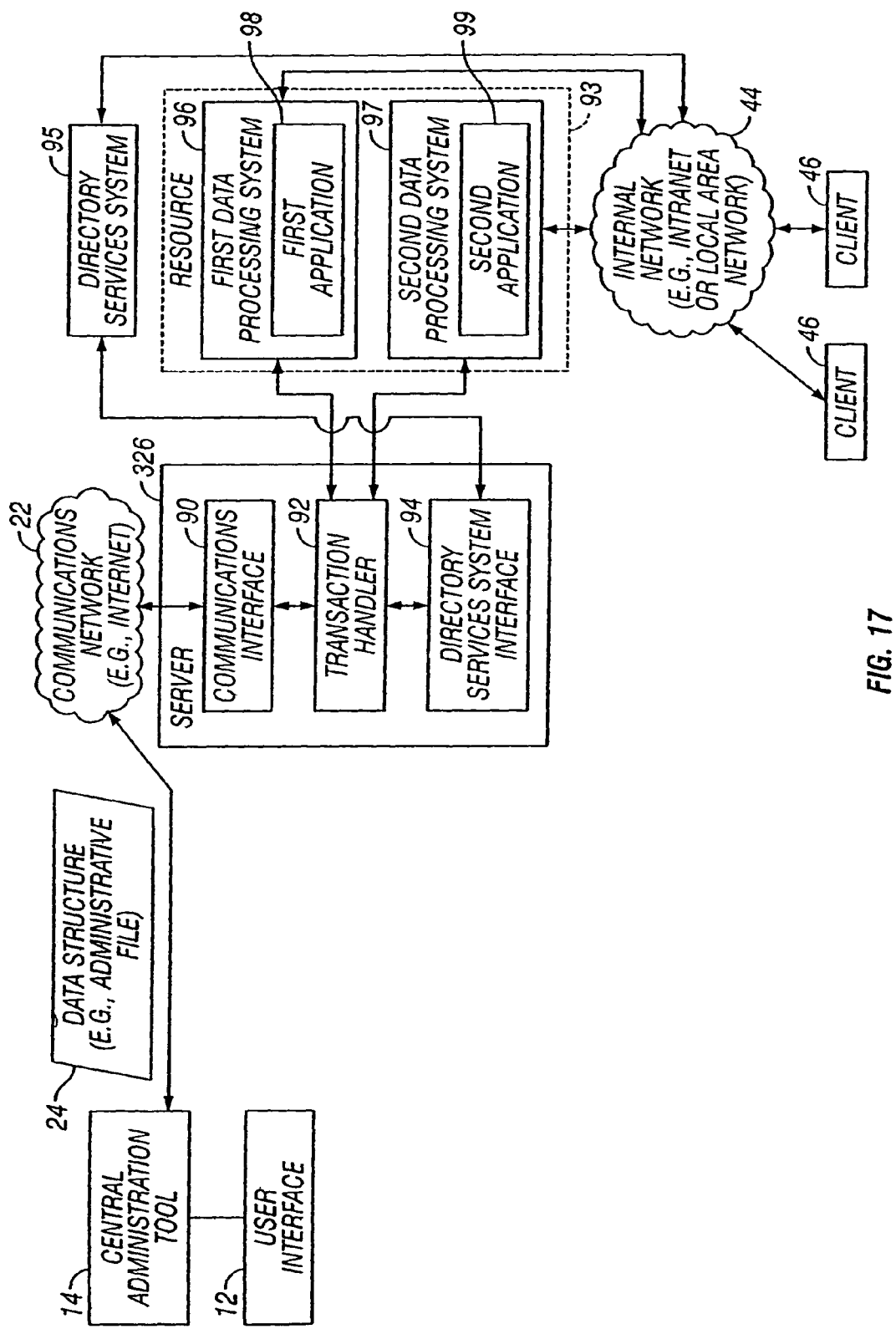
FIG. 17 is a block diagram of one embodiment of an administration system for administering one or more resources for a client or a user in accordance with the invention.

FIG. 17 is a block diagram of an administration system for managing one or more resources 93 for a user of a computer system. Like reference numbers in FIG. 1 and FIG. 17 indicate like elements.

A central administration tool 14 communicates to a server 326 via a communications network 22. In turn, the server 326 communicates with a directory services system 95 and one or more resources 93. Although the resources 93 of FIG. 17 comprise a first data processing system 96 that supports a first application 98 and a second data processing system 97 that supports a second application 99, the resources 93 may be supported by a single data processing system, a database management system, or the like. Clients 46 access the resources 93 via the internal network 44 according to parameters defined by an administrator of the central administration tool 14. For example, from a user interface 12 of the central administration tool 14, the administrator may define whether a client 46 has access to the first application 98, the second application 99, or both. Further, the from the central administration tool 114, an administrator may define the extent of the access of each client 46 to the first data processing system 96 and the second data processing system 97 and other attributes (besides access) associated with a user or a resource 93.

The server 326 comprises a communications interface 90, a transaction handler 92, and a directory services interface 94. The communications interface 90 supports communications (e.g., two-way communications) between the central administration tool 14 and the server 326 over the communications network 22. The communications interface 90 is coupled to the transaction handler 92. In turn, the transaction handler 92 is coupled to the directory services interface 94.

The directory services interface 94 is arranged to communicate with a directory services system 95 to support management of attributes associated with users. The directory services system 95 facilitates maintenance of the attributes associated with users, resources 93, or both.

The transaction handler 92 facilitates communication with one or more resources 93. As shown, the resources 93 include a first data processing system 96 and a second data processing system 97. The first data processing system 96 supports a first application 98, and the second data processing system 97 supports a second application 99. One or more clients 46 may use the first application 98 and the second application 99, to carry out data processing tasks in accordance with program instructions of the first application 98 and second application 99.

In FIG. 17, a system for administering a resource 93 for a user of a computer system, network, or client-server system supports maintenance of data integrity and/or synchronization between the directory services system 95 and one or more resources 93. A user interface 12 supports inputting a request to manage an attribute of a resource 93. A central administration tool 14 arranges the request into a file for transmission over a communications network 22. A directory services interface 94 determines if a user associated with the request is authorized to carry out a command embedded in the request. A transaction handler 92 for interprets the request if the use associated with the request is authorized and/or if a logical constraint upon the request is satisfied.

The transaction handler 92 executes the request with respect to data storage associated with one or more applications. The transaction handler 92 updates a value of the attribute of at least one application per the request. The directory services interface 94 supports saving a former state of the attribute for a directory services system 95. The directory services interface 94 is arranged to revert to the saved former state of the attribute for the directory services system 95 if the command cannot be executed by at least one of the first data processing system 96, the second data processing system 97, and a data storage allocation associated with an application (98, 99).

The transaction handler 92 generates an acknowledgement for transmission to the central administration tool 14. The acknowledgement message contains data on whether or not the request updated a value of the attribute in data storage for at least one application (98, 99). The transaction handler 92 accesses the applications or resources 93 to modify, add or delete one or more attributes pursuant to the request. For example, the transaction handler 92 applies a global password and account identifier to access one or more data storage allocations associated with corresponding applications to update the data storage units consistent with the request.

Figure 18:
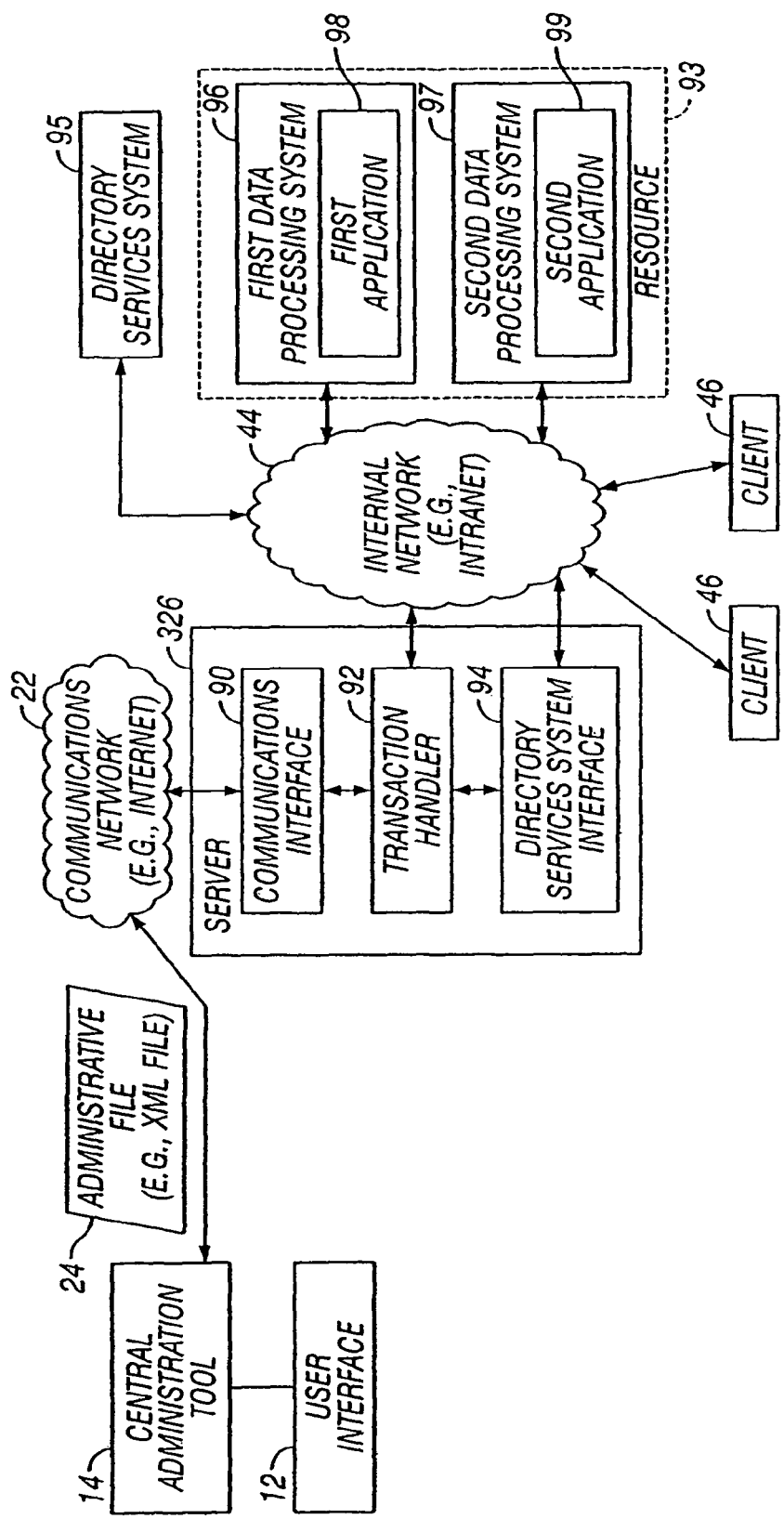
FIG. 18 is a block diagram of another embodiment of an administration system for administering one or more resources for a client or a user in accordance with the invention.

FIG. 18 illustrates a data administration system that is similar to that of FIG. 17, except FIG. 18 includes an internal network 44 for routing, directing, or conveying communications between the server 326 and one or more of the following elements: the directory services system 95, the first data processing system 96, and the second data processing system 97. The internal network 44 may comprise the Intranet. Like reference numbers in FIG. 17 and FIG. 18 indicate like elements.

Figure 19:
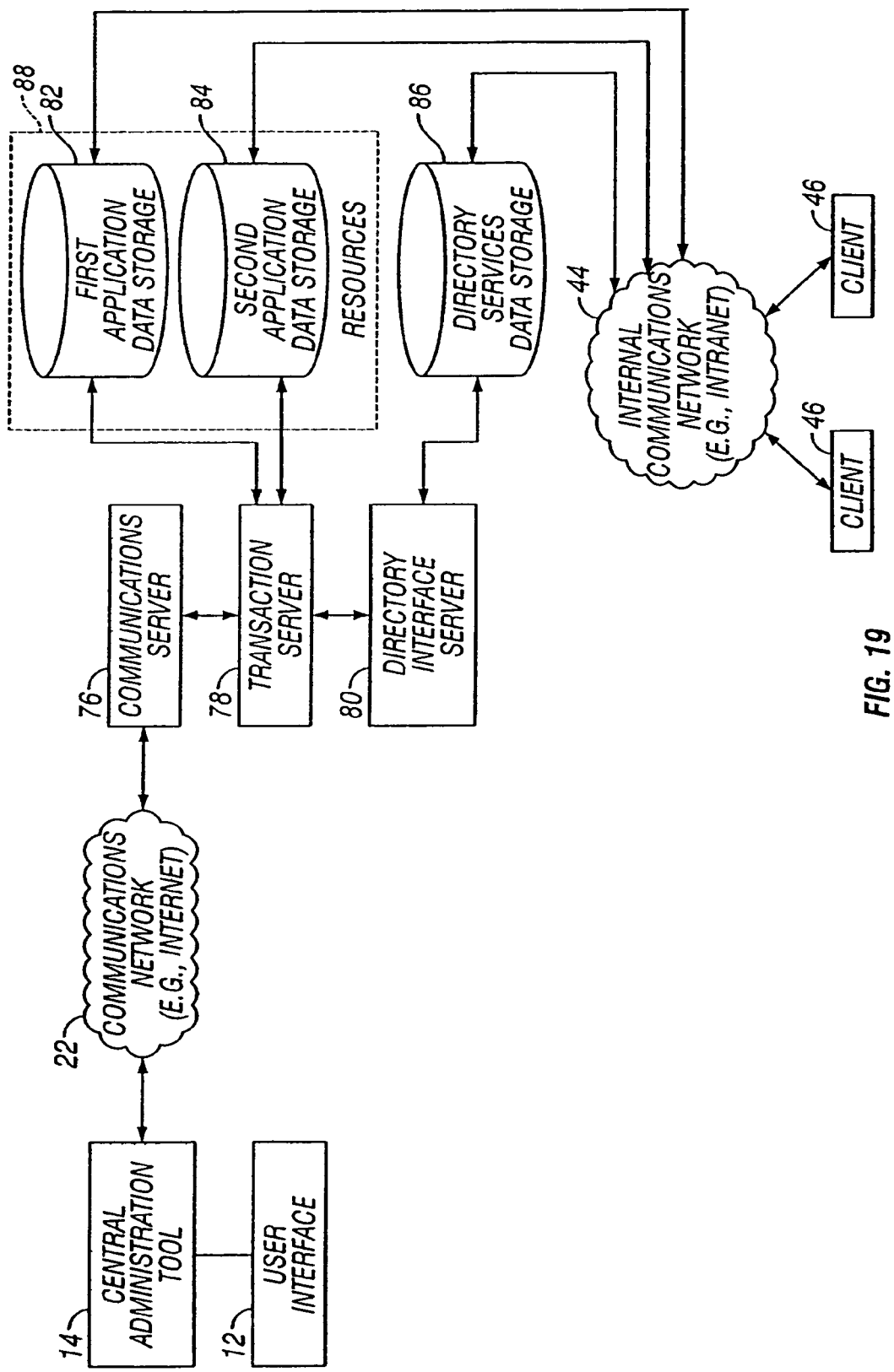
FIG. 19 is a block diagram of yet another embodiment of an administration system for administering one or more resources of a client or a user in accordance with the invention.

FIG. 19 illustrates a data administration system that is similar to FIG. 17, except FIG. 19 replaces the server 326 with a plurality of separate servers (e.g., 76, 78 and 80). Further, the resources 93 and directory services system 95 of FIG. 19 are defined in terms of data storage allocations, as opposed to data processing systems. In practice, the data storage allocations may be associated with one or more database management systems or data processing systems. Like reference numbers in FIG. 17 and FIG. 19 indicate like elements.

In one embodiment, the communications server 76, the transaction server 78, and the directory interface server 80 of FIG. 19 perform the same functions as the server 326 of FIG. 18. The directory interface server 80 communicates with a directory services data storage 86 to determine whether the administrator is authorized to take an action associated with a request.

The transaction server 78 communicates with at least one of a first application data storage 82 and a second application data storage 84, if the directory interface server 80 indicates that the administrator is authorized to take an action associated with the request. The transaction server 78 interprets the request, which may be expressed in a file (e.g., an XML file) transmitted from the central administration tool 14 via the communications network 22. The transaction server 78 may log into or access the first application data storage 82 and the second application data storage 84 at an administrative level to execute a command in the transmitted file (e.g., the XML file). For example, the command may modify, delete, or add an attribute or an attribute value associated with a user or a resource 88 (e.g., an application program).

Figure 20:
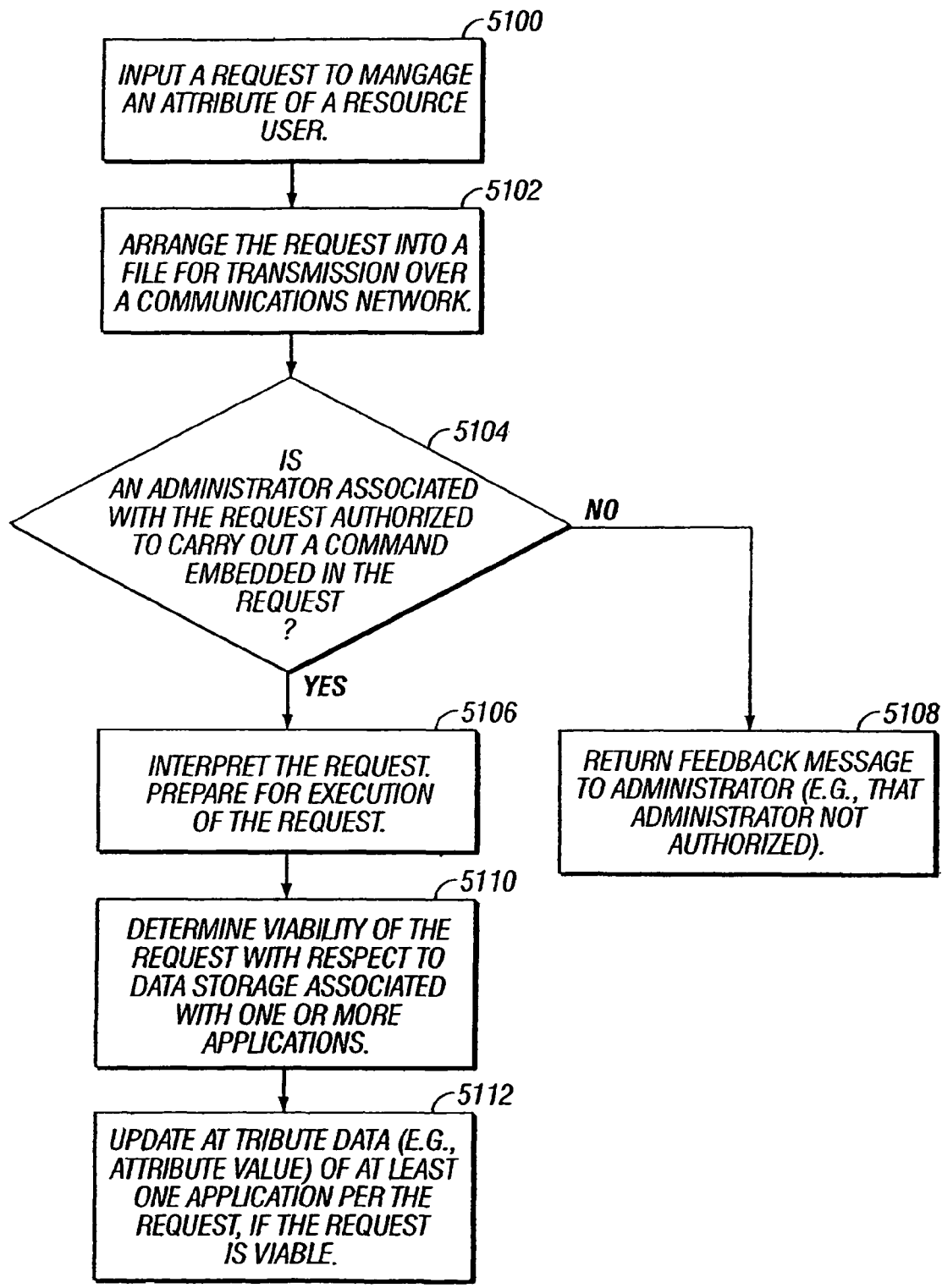
FIG. 20 is a flow chart of a method for administering one or more resources for client or a user in accordance with the invention.

FIG. 20 is a flow chart of a method for managing one or more resources (e.g., 88 or 93) for a user of a computer system, a client-server system, or a network. The method of FIG. 20 starts in step S100. The method of FIG. 20 may be applied to any of the systems of FIG. 17 through FIG. 19, inclusive.

In step S100, an administrator inputs a request to manage an attribute of a resource (88 or 93) or user. For example, an administrator inputs a request to modify, add, or delete an attribute of a resource (88 or 93) or a user via a user interface 12 of a central administration tool 14. The user uses or seeks to use one or more resources (88 or 93) associated with a computer system (e.g., a client-server network). An administrator can enter a modification, addition, or deletion of an attribute of a user or resource (88 or 93) into an electronic form, template or document via a user interface 12.

In step S102, a request is arranged into a file for transmission over a communications network 22. In one example, the central administration tool 14 may convert the request into an extensible mark-up language file or some other data structure 24 that is compatible with transmission over the communications network 22 (e.g., the Internet). In another example, the central administration tool 14 converts an electronic form or data from a template (e.g., of FIG. 7-FIG. 17) into an extensible mark-up language file or some other data structure 24 that is compatible with transmission over the communications network 22.

The file may contain a command identifier, a resource identifier, an attribute and an attribute value of the attribute. The command identifier defines an action, such as adding, deleting, or modifying an attribute. The resource identifier (e.g., application identifier) specifies which resources or applications are affected by the action. The resource identifiers may include a first application identifier for the first application 98, and a second application identifier for the second application 99 that is distinct from the first application identifier. The attribute may be defined by an attribute identifier that defines a characteristic of a resource (88 or 93) or a user. The attribute may have a numerical value, a vector value, a scalar value, or a logical value, for example.

In step S104, the server 326, the directory services interface 94, or the directory interface server 80 determines if an administrator associated with the request is authorized to carry out a command embedded in the request. The determination of whether an administrator is authorized may depend upon a security level assigned to an administrator, the requisite work responsibilities of an administrator, any supervisory authority of the administrator, the characteristics of resources (88 or 93), the characteristics of a user associated with the request, the characteristics of a group associated with the request, the characteristics of applications associated with the request, and a logical validation of the request. If a user is authorized to carry out the command embedded in the request, the method continues with step S106. However, if a user is not authorized to carry out the command embedded in the request, the method continues with step S108.

In an alternate embodiment, step S104 may include an additional procedure concerning the logical validation of the request. With respect to the configuration of FIG. 17, a logical validation of the request determines if the request is consistent with the proper format of data structure 24 and overall logical scheme of the directory services system 95, the first data processing system 96, and the second data processing system 97. With respect to the configuration of FIG. 19, a logical validation of the request determines if the request is consistent with the proper format of data structure 24 and overall logical scheme of the directory services data storage 86, the first application data storage 82, and the second application data storage 84. The logical validation may be applied in addition to the evaluation or determination that an administrator is otherwise authorized to carry out a command embedded in the request. In the alternate embodiment, if the request passes the logical validation and if the administrator is otherwise authorized to carry out the command in the request, the method would continue with step S106; otherwise, the method would continue with step S108.

In step S106, a server 326, a transaction handler 92, or a transaction server 78 interprets the request and prepares for execution of the request. In one embodiment, prior to requesting the execution of a change, modification, or addition of an attribute value, the transaction handler 92 or transaction server 78 may use a global password and account identifier (e.g., administrative log-in identifier) to log onto a resource (88 or 93) in a single transaction for expedient management of administrative matters. With respect to the configuration of FIG. 17, the transaction handler 92 may use a global password and administrative log-in identifier to log onto the first data processing system 96 and the second data processing system 97.

In another embodiment, prior to making the change, modification, or addition of an attribute value, the transaction handler 92 may use different password and an a different account identifier to log onto the first data processing system 96 and the second data processing system 97, or into the first application 98 and the second application 99.

In step S108, the server 326, the transaction handler 92, or the transaction server 78 returns a feedback message to an administrator at the user interface 12. In one example, the feedback message may inform the administrator that an administrator is not authorized to execute the command embedded in the request. In another example, the feedback message may inform the administrator that the administrator is not authorized, the command is logically inconsistent with the resources (88 or 93), or both.

In step S110 after step S106, a server 326, transaction handler 92, or transaction server 78 determines the viability of the request or attempts to execute a request with respect to at least one resource (88 or 93). In one example, the transaction handler 92 attempts to execute a request with respect to a data storage allocation associated with one or more applications (e.g., a first application 98 and a second application 99) or a resource (88 or 93). Accordingly, the server 326 or the transaction server 78 transmits a request to change, modify, add or delete attribute data (e.g., an attribute value) of a resource (88 or 93) consistent with the request in the file received via the communications network 22.

In step S110, if the server 326, transaction handler 92, or transaction server 78 is unable to make a change to the desired resource (88 or 93) identified in the received data structure 24, the transaction handler 92 informs the directory services system 95 or the directory services data storage 86 and undoes any update that may have already taken effect at the directory services system 95 or the directory services data storage 86.

For example, if the server 326 is unable to make a change in the first application 98, the second application 99, or another application, the server 326 informs the directory services system 95. Accordingly, the attribute data (e.g., attribute values) defined by the directory services system 95, the first application 98, and the second application 99 are consistent with each other. The server 326, the transaction handler 92, or the transaction server 78 may be unable to make change because of the lack of authorized access, a communications failure, the absence of an attribute, or the absence of a permitted attribute value. Yet, data integrity and consistency is preserved amongst the resources 93 to the extent possible.

If the transaction handler 92, the server 326, or the transaction server 78 326 is unable to update the attribute data (e.g., attribute value) of the selected applications per the request, the transaction handler 92, the server 326, or the transaction server 78 may take the following remedial action. First, a former state of the attribute for the directory services system 95 or the directory services data storage 86 is saved. Second, the former state of the attribute data is reverted to for the directory services system 95 or the directory services data storage 86 if the command cannot be executed by at least one resource (e.g., a data storage allocation for an application) or all desired resources to be updated by the attribute data per the request (e.g., the data structure 24).

The server 326 or communications server 76 acknowledges whether or not the request updated attribute data in a resource (88 or 93) for at least one application. The server 326 or communications server 76 may receive a status of whether or not the request was implemented via the transaction handler 92 or the transaction server 78. The transaction server 78 or the transaction handler 92 may serially update the attribute data in the data storage allocations of different applications or resources (88 or 93).

In step S112, if the request is viable, attribute data is updated for at least one of following: a resource (88 or 93), a directory services data storage 86, and a directory services system 95. For example, the first application data storage 82, the second application data storage 84, or both may modify, add, or delete an attribute value consistent with the request in the file received via the communications network 22.

Following step S112, the administrator may receive an acknowledgement if the server (e.g., server 326) was able to update (e.g., modify, add, or delete) the attribute of the directory services and the corresponding associated attribute of at least one resource (88 or 93). The administrator may receive an acknowledgement if an update could not be executed because of a data inconsistency. Previous data is restored to the directory services data storage 86 or the directory services system 95 if the update is successful in the directory services system 95 and if the update is not successful in the resources (88 or 93), such as the first application 98 and the second application 99.

The foregoing description of the invention describes several illustrative embodiments. Other embodiments, variations, alterations or alternatives may fall within the scope of the invention and the following claims. Accordingly, the claims should be accorded the broadest interpretation possible consistent with the specification set forth in the description.

The invention claimed is:

1. A client-server data processing system for providing one or more administrators access to at least one resource, the data processing system comprising:
    a first security manager having a first set of administrative user identifiers associated with an administrator and a first set of corresponding passwords, the first security manager managing access of the administrator to a first resource via use of the first set of administrative user identifiers and the first set of corresponding passwords;
    a second security manager having a second set of administrative user identifiers associated with the administrator and a second set of corresponding passwords, the second security manager managing access of the administrator to a second resource via use of the second set of administrative user identifiers and the second set of corresponding passwords;
    a security controller for interfacing with the first security manager and the second security manager to provide an administrative global user identifier associated with the administrator, wherein the administrative global user identifier is representative of both the first set of administrative user identifiers and the second set of administrative user identifiers;
    a global password and the global user identifier triggering the execution of a script, transparent to the administrator, that logs the administrator into the first security manager and the second security manager, wherein the global user identifier is transparent to the administrator;
    a directory services system; and
    a central authentication module associated with the directory services system, the central authentication module having a third set of user identifiers associated with the administrator and corresponding passwords, the global password and the administrative global user identifier arranged to log the administrator into the directory services system associated with the central authentication module.

2. The system according to claim 1 wherein the first security manager comprises a knowledge management system.

3. The system according to claim 1 wherein the second security manager comprises a filenet document center.

4. The system according to claim 1 wherein the first security manager comprises a lightweight-directory-access-protocol compliant knowledge management system.

5. The system according to claim 1 wherein the security controller provides the administrator with access at an administrative level to modify an attribute of at least one resource.

6. The system according to claim 1 wherein the security controller provides the administrator with access at an administrative level to delete an attribute of at least one resource.

7. The system according to claim 1 wherein the security controller provides the administrator with access at an administrative level to add an attribute of at least one resource.

8. The system according to claim 1 wherein at least one of the first resource and the second resource comprises at least one of an application program, a database of user listings, an address of a printer on a network.

9. A method for providing one or more administrators access to at least one resource, comprising:
    associating a first security manager having a first set of administrative user identifiers with an administrator and a first set of corresponding passwords, the first security manager managing access of the administrator to a first resource via use of the first set of administrative user identifiers and the first set of corresponding passwords;
    associating a second security manager having a second set of administrative user identifiers with the administrator and a second set of corresponding passwords, the second security manager managing access of the administrator to a second resource via use of the second set of administrative user identifiers and the second set of corresponding passwords;
    providing an administrative global user identifier associated with the administrator by interfacing with the first security manager and the second security manager, wherein the administrative global user identifier is representative of both the first set of administrative user identifiers and the second set of administrative user identifiers, wherein the global user identifier is transparent to the administrator;
    triggering the execution of a script, transparent to the administrator, by using a global password and the global user identifier, that logs the administrator into the first security manager and the second security manager; and
    associating a central authentication module with a directory services system, the central authentication module having a third set of user identifiers associated with the administrator and corresponding passwords, wherein the global password and the administrative global user identifier are arranged to log the administrator into the directory services system associated with the central authentication module.

10. The method of claim 9, further comprising logging the administrator into the directory services system associated with a central authentication module by using the global password and the administrative global user identifier.

11. A non-transitory computer readable storage medium comprising:
    a processor configured to:
    associate a first security manager having a first set of administrative user identifiers with an administrator and a first set of corresponding passwords, the first security manager managing access of the administrator to a first resource via use of the first set of administrative user identifiers and the first set of corresponding passwords;
    associate a second security manager having a second set of administrative user identifiers with the administrator and a second set of corresponding passwords, the second security manager managing access of the administrator to a second resource via use of the second set of administrative user identifiers and the second set of corresponding passwords;
    provide an administrative global user identifier associated with the administrator by interfacing with the first security manager and the second security manager, wherein the administrative global user identifier is representative of both the first set of administrative user identifiers and the second set of administrative user identifiers, wherein the global user identifier is transparent to the administrator;

trigger the execution of a script, transparent to the administrator, by using a global password and the global user identifier, that logs the administrator into the first security manager and the second security manager; and associate a central authentication module with a directory services system, the central authentication module having a third set of user identifiers associated with the administrator and corresponding passwords, wherein the global password and the administrative global user identifier are arranged to log the administrator into the directory services system associated with the central authentication module.

\* \* \* \* \*